(12) United States Patent
Uehara et al.

(10) Patent No.: US 7,663,570 B2
(45) Date of Patent: Feb. 16, 2010

(54) IMAGE DISPLAY DEVICE, PORTABLE TERMINAL DEVICE AND DISPLAY PANEL

(75) Inventors: Shin-ichi Uehara, Tokyo (JP); Nobuaki Takanashi, Tokyo (JP)

(73) Assignee: NEC Corporation, Tokyo (JP)

( * ) Notice: Subject to any disclaimer, the term of this patent is extended or adjusted under 35 U.S.C. 154(b) by 775 days.

(21) Appl. No.: 10/786,480

(22) Filed: Feb. 26, 2004

(65) Prior Publication Data

US 2004/0169670 A1 Sep. 2, 2004

(30) Foreign Application Priority Data

Feb. 27, 2003 (JP) .............................. 2003-052044

(51) Int. Cl.
*G09G 5/00* (2006.01)
(52) U.S. Cl. .................. 345/8; 345/6; 385/16
(58) Field of Classification Search ................. 345/6–9, 345/87, 88, 102; 349/15, 17, 18, 41, 57, 349/62
See application file for complete search history.

(56) References Cited

U.S. PATENT DOCUMENTS

| | | | | |
|---|---|---|---|---|
| 6,603,504 | B1 * | 8/2003 | Son et al. | 348/54 |
| 6,909,479 | B2 * | 6/2005 | Iijima | 349/109 |
| 7,058,252 | B2 * | 6/2006 | Woodgate et al. | 349/17 |
| 2003/0117551 | A1 * | 6/2003 | Fujimori et al. | 349/113 |

FOREIGN PATENT DOCUMENTS

| | | | |
|---|---|---|---|
| JP | 6-332354 | A | 12/1994 |
| JP | 9-73049 | A | 3/1997 |
| JP | 9-179220 | A | 7/1997 |
| JP | 9-197344 | A | 7/1997 |
| JP | 11-149126 | A | 6/1999 |
| JP | 2002-207227 | A | 7/2002 |
| JP | 2002-265420 | A | 12/2002 |
| WO | 03/015424 | A2 | 2/2003 |

OTHER PUBLICATIONS

C. Masuda, "Three-Dimensional Display", pp. 1.
"Nikkei Electronics", (hereinafter referred to as Non-patent literature 2), No. 838, Jan. 6, 2003, pp. 26-27.
Nikkei Microdevices Separate Sheets, "flat panel display", Nikkei BP Co., Ltd., pp. 108-113.

* cited by examiner

*Primary Examiner*—Kevin M Nguyen
(74) *Attorney, Agent, or Firm*—Sughrue Mion, PLLC

(57) ABSTRACT

First pixels for the left eye and second pixels for the right eye in the semi-transmissive liquid crystal display panel are alternately disposed in the array direction of cylindrical lenses in a lenticular lens. A first transmissive region and a first reflective region are disposed in the first pixel for the left eye, and a second transmissive region and a second reflective region are disposed in the second pixel for the right eye. In this case, the first transmissive regions and the second reflective regions in the first pixels are alternately disposed and the second transmissive regions and reflective regions in the second pixels are alternately disposed in the longitudinal direction of the cylindrical lenses.

18 Claims, 23 Drawing Sheets

IMAGE DISPLAY DEVICE, PORTABLE TERMINAL DEVICE AND DISPLAY PANEL

BACKGROUND OF THE INVENTION

1. Field of the Invention

The present invention relates to an image display device which can display different images toward plural viewpoints, a portable terminal device in which such the image display device is mounted, and a display panel which is mounted in such an image display device, and more specifically the present invention relates to an image display device, a portable terminal device and a display panel, all of which allow the electric power consumption to be reduced.

2. Description of the Related Art

Conventionally, various investigations have been made on a display device capable of displaying a three-dimensional image. Regarding the binocular vision, the Greek mathematician, Euclid, stated on 280 B.C. that "the binocular vision is a visual perception which a person can be obtained, simultaneously watching with his own left and right eyes two different images which are obtained by looking at a single object from different directions" (see, for example, an article by Chihiro Masuda, "Three-Dimensional Display", Sangyo-Tosho, K. K.; hereinafter referred to as Non-patent literature 1). That is, the three-dimensional image display device is required in its function to provide two images having a parallax different from each other for the left and right eyes.

In the past, a greater number of three-dimensional image display methods were studied in order to actually realize such a function. The methods can generally be classified into those requiring using eyeglasses and those requiring not using eyeglasses. The anaglyph method using the color difference, and the polarized eyeglasses method using the polarization pertain to the method requiring using eyeglasses. Because it is substantially difficult to avoid troublesome resulting from the usage of eyeglasses, the methods requiring not using eyeglasses have been mostly studied in the recent years.

The lenticular lens method, and the parallax barrier method and the like pertain to the method without usage of eyeglasses. The lenticular lens method was invented on 1910 or so by Ives et al. The parallax barrier method was envisaged by Berthier on 1896, and actually demonstrated by Ives on 1903.

As described in the non-patent literature 1, the parallax barrier is a light shield (barrier) having a number of fine stripe-shaped openings, i.e., slits extending in the direction parallel to each other. A display panel is disposed on the rear side of the parallax barrier. In the display panel, pixels for one's own left eye and pixels for one's own right eye are repeatedly arranged in a direction perpendicular to the longitudinal direction of the slits. As a result, part of the light leaving each pixel is intercepted when it passes through the parallax barrier. More specifically, the pixels are arranged such that the light emerged from the pixels for the left eye arrives at the left eye of a viewer, but the light traveling toward the right eye is intercepted, whereas the light emerged from the pixels for the right eye arrives at the right eye but the light traveling toward the left eye is intercepted. Accordingly, the light emerged from the pixel for the left eye and the light emerged from the pixel for the right eye arrives respectively at the left and right eye, so that the viewer is able to identify a three-dimensional image.

FIG. 1 is a perspective view of a conventional dual eye type three-dimensional image display device using a parallax barrier, and FIG. 2 is a diagram showing an optical model of the three-dimensional image display device. As shown in FIGS. 1 and 2, the conventional three-dimensional image display device is equipped with a transmissive liquid crystal display panel 21, and display pixels are arranged in the form of a matrix in the transmissive liquid crystal display panel 21. Each display pixel includes a pixel 43 for the left eye and a pixel 44 for the right eye. In this case, the pixel 43 for the left eye and the pixel 44 for the right eye are delimited respectively by corresponding light shield sections 6. These light shield sections 6 serve to prevent the color mixing in an image as well as to transmit display signals to the pixels.

Moreover, a parallax barrier 7 is disposed in the front of the liquid crystal display panel 21, i.e., on the side of a viewer. A slit 7a extending in a direction is formed in the parallax barrier 7. The slit 7a is disposed for a pair of the pixel 43 for the left eye and the pixel 44 for the right eye. Moreover, a light source 10 is disposed in the rear of the liquid crystal display panel 21.

As shown in FIG. 2, the light emitted from the light source 10 passes through both the pixel 43 for the left eye and the pixel 44 for the right eye in the transmissive liquid crystal display panel 21, and then part of the light is intercepted in the case when the light passes through the slit 7a of the parallax barrier 7. Thereafter, the light proceeds to an area EL or ER. Accordingly, if the viewer places his own left eye 52 on the area EL and his own right eye 51 on the area ER, an image for the left eye is received with his own left eye 52 and an image for the right eye is received with his own right eye 51, thereby enabling a three-dimensional image to be identified by the viewer.

At the beginning of the parallax barrier method being demonstrated, a parallax barrier is interposed between the display panel and the viewer's own eyes, thereby causing the visibility to be reduced due to the eyesore. However, in the recent liquid crystal display device, the parallax barrier is disposed in the rear of the display panel and therefore the visibility is improved. Thus, intensive studies have been made, and, in fact, new products have been demonstrated (see, table 1 in "Nikkei Electronics" (hereinafter referred to as Non-patent literature 2), No. 838, pp. 26-27, issued on Jan. 6, 2003). The product described in the non-patent literature 2 is a parallax barrier method type three-dimensional image display device using a transmissive liquid crystal display panel.

On the other hand, the lenticular lens method is a three-dimensional image display method using a lenticular lens. Such a lenticular lens is a lens, which has a flat plane on one side and a plurality of hog-backed convex portions (cylindrical lenses) in a direction on the other side. The pixels for displaying an image for the right eye and pixels for displaying an image for the left eye are alternately arranged on the focal plane of the lens. Pixel sections each comprising a pixel for the right eye and a pixel for the left eye are arranged along a line extending in one direction such that the pixel sections pertain to a convex portion. Consequently, the light emerged from each pixel is deflected by the lenticular lens such that it proceeds either toward the left eye or the right eye, and therefore two images different from each other can be sensed respectively with the right and left eyes, thereby enabling a three-dimensional image to be confirmed by the viewer.

FIG. 3 is a perspective view of a conventional dual eye type three-dimensional image display device using a lenticular lens. FIG. 4 is a diagram showing the optical model of the three-dimensional image display device. As shown in FIGS. 3 and 4, the conventional three-dimensional image display device is equipped with a transmissive liquid crystal display panel 21, and display pixels are disposed in the form of a matrix in the liquid crystal display panel 21. A pixel 43 for the left eye and a pixel 44 for the right eye are disposed in each display pixel. In this case, a lenticular lens 3 is disposed on the front side of the liquid crystal display panel 21, i.e., on the side of a viewer. Cylindrical lenses 3a of hog-backed convex portions extending in one direction are formed parallel to each other in the lenticular lens 3. The cylindrical lenses 3a are disposed so as to keep the conformity to two pixels in the transmissive liquid crystal display panel 21, i.e., to a pair of the pixel 43 for the left eye and the pixel 44 for the right eye. Moreover, a light source 10 is disposed on the rear side of the liquid crystal display panel 21.

As shown in FIG. 4, the light emitted from the light source 10 passes through a pixel 43 for the left eye and a pixel 44 for the right eye in the transmissive liquid crystal display panel 21, and then deflected by the cylindrical lenses 3a toward either area EL or ER. When, therefore, a viewer places his own left eye 52 onto the area EL and his own right eye 51 onto the area ER, an image for the left eye is sensed with the left eye 52 and an image for the right eye is sensed with the right eye 51, thereby enabling a three-dimensional image to be confirmed by the viewer.

Undesirable light beams are "hidden" by the barrier in the parallax barrier method, whereas, in the lenticular lens method, the brightness on the display plane is not principally reduced in the three-dimensional display, compared with that of the two-dimensional display, because the proceeding direction of light is deflected. In view of this fact, intensive studies are now being made on the application of the lenticular lens method to portable devices and others, in which a high brightness display and reduced electric power consumption are particularly emphasized.

However, a portable terminal device, such as a cellular phone or the like, in which such a three-dimensional image display devices is mounted, are often used in very bright locations, such as the outdoors. In such a location, therefore, a sufficient enhancement of the brightness on a display plane is required to ensure sufficiently satisfactory visibility. In the case when such a three-dimensional image display device is mounted in such a portable terminal device, a battery is normally used as a power supply. However, the weight and size of the portable terminal device are strictly restricted, and therefore the capacity of the battery is also strictly restricted. Consequently, both the downsizing and weight saving of the portable terminal device, along with an increase in the brightness on the display plane, reduce the usable period of continuous operation after charged.

Besides the three-dimensional image display device, a display for simultaneously displaying plural images has been developed as an image display device using a lenticular lens (see Japanese Patent Laid-Open No. 332354/1994 (FIG. 9) referred to as Patent literature 1). This display simultaneously displays images different from one another in the direction of observation under the same conditions using the image distribution capability of a lenticular lens. This single display device can provide a plurality of viewers, positioned in different directions with respect to the display device, with images different from one another. The patent literature 1 describes that the use of this display device can reduce the required set-up space and the power rate as compared with a case of using ordinary single-image display devices by the number of images to be displayed.

On the other hand, semi-transmissive liquid crystal display devices capable of displaying in the reflection and transmission modes in a conventional two-dimensional image display device have been previously investigated (see, for example, Nikkei Microdevices Separate Sheets "flat panel display", Nikkei BP Co. Ltd., pp. 108-113 and FIG. 13 (hereinafter referred to as Non-patent literature 3)). FIG. 5 is a plan view of a conventional semi-transmissive liquid crystal display device disclosed in the non-patent literature 3. As shown in FIG. 5, in the conventional semi-transmissive liquid crystal display device, each pixel 40 in a semi-transmissive liquid crystal display panel 22 comprises three color regions: R (red) region, G (green) region and B (blue) region. In addition, each color region can be divided into a transmissive region and reflective region. In other words, the pixel 40 can be divided into six regions: transmissive region (red) 41R; reflective region (red) 42R; transmissive region (green) 41G; reflective region (green) 42G; transmissive region (blue) 41B; and reflective region (blue) 42B.

In each reflective region, a metal film (not shown) is formed on the surface of the rear glass substrate of two glass substrates in the semi-transmissive liquid crystal display panel 22, in which case, a liquid crystal is in contact with the above-mentioned surface. The metal film reflects the exterior light. Accordingly, in the transmissive region, the light from the light source (not shown) passes through the liquid crystal layer (not shown) in the liquid crystal panel to form an image. In the reflective region, the exterior light, such as natural light, indoor illuminating light and others, passes through the liquid crystal layer, and the light thus passed through is reflected by the metal film, and again passes through the liquid crystal layer to form an image. Therefore, the exterior light can be used as part of a light source in a bright location where exterior light is flooded. As a result, the semi-transmissive liquid crystal display device provides a higher brightness on the display plane and reduces the electric power consumption necessary for activating the light source, compared with the transmissive liquid crystal display apparatus.

However, there are the following problems in the above prior arts. FIG. 6 is a perspective view of a conventional dual eye type three-dimensional image display device, using a semi-transmissive liquid crystal display panel in the lenticular lens method, and FIG. 7 is a diagram showing the optical model thereof.

In order to reduce the electric power consumption in the three-dimensional image display device, it is conceivable that the semi-transmissive liquid crystal display panel 22 shown in FIG. 5 can be used in the three-dimensional image display device of lenticular lens method shown in FIG. 3. However, there are the following problems in such a semi-transmissive three-dimensional image display device.

In the semi-transmissive liquid crystal display panel 22 shown in FIG. 5, each pixel 40 is approximately square and each pixel 40 is divided into three color regions R, G and B such that each color region becomes rectangular. When, therefore, each color region is divided into the transmissive region and reflective region, each color region is divided along a line extending in the longitudinal direction.

In the case when the semi-transmissive liquid crystal display panel 22 shown in FIG. 5 is used as a display panel for a three-dimensional image display device, a pair of a pixel 40 for displaying an image for the left eye (hereinafter, referred to as pixel 43 for the left eye) and a pixel for displaying an image for the right eye (hereinafter, referred to as pixel 44 for the right eye) is used as a basic pixel section. Thereby, the relationship between the paired pixels and the lenticular lens 3 can be represented, as shown in FIG. 6. For the sake of simplicity, no division for each color is given in FIG. 6. The transmissive region (red) 41R, transmissive region (green) 41G, and transmissive region (blue) 41B of a single pixel shown in FIG. 5, that is, the pixel 43 for the left eye are regarded as a transmissive region 410 of a pixel for the left eye, and the reflective region (red) 42R, reflective region (green) 42G and reflective region (blue) 42B of the pixel 43 for the left eye are regarded as a reflective region 420 of a pixel for the left eye, whereas the transmissive region (red) 41R, transmissive region (green) 41G and transmissive region (blue) 41B of the pixel 44 for the right eye, which pixel is a paired one as for the pixel 43 for the left eye, are regarded as a transmissive region 430 of a pixel for the right eye, and the reflective region (red) 42R, reflective region (green) 42G and reflective region (blue) 42B of the pixel 44 for the right eye are regarded as a reflective region 440 of a pixel for the right eye.

In the three-dimensional image display device, the transmissive region 410 of the pixel for the left eye, the reflective region 420 of the pixel for the left eye, the transmissive region 430 of the pixel for the right eye and the reflective region 440 of the pixel for the right eye are arranged in this order and in the array direction 12 of the cylindrical lens 3a, that is, in the direction perpendicular to the longitudinal direction 11 of the cylindrical lenses 3a, so as to provide the conformity to each cylindrical lens 3a. The structural arrangement other than the above in the three-dimensional display device is the same as those in the conventional device shown in FIG. 3.

As a result, as shown in FIG. 7, the light emitted from the light source 10 passes through the transmissive region 410 in the pixel for the left eye and the transmissive region 430 in the pixel for the right eye in the semi-transmissive liquid crystal panel 22, and then deflected by the cylindrical lenses 3a of the lenticular lens 3, and further travels to an area ETL or ETR. On the other hand, the exterior light is incident on the semi-transmissive liquid crystal panel 22, after passing through the lenticular lens 3. The exterior light passes through a liquid crystal layer in the reflective region 420 in the pixel for the left eye and a liquid crystal layer in the reflective region 440 in the pixel for the right eye, and then reflected by the metal film, so that it again passes through the liquid crystal layers. Thereafter, the exterior light is deflected by the cylindrical lenses 3a and proceeds toward area ERL or ERR. As a result, when a viewer places his own left eye 52 on the area ETL and his own right eye 51 on the area ERL, a three-dimensional image resulting from the transmitted light is viewed, and when the viewer places his own left eye 52 on the area ERL and his own right eye 51 on the area ERR, a three-dimensional image resulting from the reflected light is viewed. Accordingly, as shown in FIG. 7, the three-dimensional image display device using the semi-transmissive liquid crystal display panel provides a greatly reduced three-dimensional visible range respectively resulting from the transmitted light and the reflected light, compared with the three-dimensional image display device using the transmissive liquid crystal display panel.

The above description is given for the three-dimensional image display device using the lenticular lens. However, a similar problem takes place in the three-dimensional image display device using the parallax barrier. In the following, this problem is described. FIG. 8 is a perspective view of a conventional dual eye type three-dimensional image display device in the parallax barrier method using a semi-transmissive liquid crystal display panel, and FIG. 9 is a diagram showing the optical model thereof.

As shown in FIG. 8, in the three-dimensional image display device, a transmissive region 410 in the pixel for the left eye, reflective region 420 in the pixel for the left eye, transmissive region 430 in the pixel for the right eye and reflective region 440 in the pixel for the right eye are arranged in this order and in the array direction 12 of the slits 7a, that is, in the direction perpendicular to the longitudinal direction 11 of the slits 7a such that it is confirmed to each slit 7a of the parallax barrier 7. The structural arrangement other than the above of the three-dimensional image display device is the same as that of the conventional device shown in FIG. 1.

As a result, as shown in FIG. 9, the light emitted from the light source 10 passes through the transmissive region 410 in the pixel for the left eye and transmissive region 430 in the pixel for the right eye, and then part of the light is intercepted in the case when it passes through the slits 7a of the parallax barrier 7. Thereafter the light passed through proceeds in the area ETL or ETR. On the other hand, the exterior light is incident on the semi-transmissive liquid crystal panel 22 via the slits 7a, and then reflected in the reflective region 420 of the pixel for the left eye and the reflective region 440 of the pixel for the right eye. Thereafter, the exterior light proceeds in the areas ERL and ERR. If, therefore, a viewer places his own left eye 52 on the area ETL and his own right eye 51 on the area ETR, he can view a three-dimensional image resulting from the transmitted light. In the case when the viewer places his own left eye 52 on the area ERL and his own right eye 51 on the area ERR, he is able to view a three-dimensional image resulting from the reflected light. As described above, even in the semi-transmissive three-dimensional image display device using the parallax barrier method, there is a problem that the three-dimensional visible range in the transmissive display and reflective display is greatly reduced, compared with the transmissive three-dimensional image display device.

A similar problem generally occurs not only in the three-dimensional image display device but also the aforementioned display of simultaneously displaying plural images. In other words, a semi-transmissive image display device suffers significant narrow visible ranges for both transmissive display and reflection display as compared with a transmissive image display device.

SUMMARY OF THE INVENTION

It is an object of the present invention to provide an image display device, which ensures a high brightness on the display plane and reduced electric power consumption, along with a wider visible range.

It is another object of the present invention to provide a portable terminal device, in which such an image display device is mounted, so that a high brightness on the display plane and reduced electric power consumption can be ensured, along with a wider visible range.

It is another object of the present invention to provide a display panel, which can be mounted in such an image display device, so that a high brightness on the display plane and reduced electric power consumption can be ensured, along with a wider visible range.

The above objects are attained by the following measures:

In a first aspect of the present invention, an image display device comprises: a light source; a display panel disposed in front of the light source and having a plurality of pixel sections in the form of a matrix, each of the pixel sections including a first pixel for displaying an image for the first viewpoint and a second pixel for displaying an image for the second viewpoint, the second pixel being disposed at a position apart from the first pixel in a first direction; and an optical unit disposed in front of the display panel for deflecting light emitted from the first and second pixels in the first direction. And, each of the first and second pixels includes a transmissive region for transmitting the light emitted from the light source to the optical unit and a reflective region for reflecting the exterior light incident from the front to the optical unit. The transmissive region and the reflective region are arranged in a second direction perpendicular to the first direction in each pixel.

In accordance with the first aspect of the invention, the transmissive region and the reflective region make it possible to adjust the intensity of light from the light source according to the intensity of the exterior light, thereby enabling the electric power consumption to be reduced, maintaining a high brightness of the image. Moreover, in the case when the optical unit deflects the light emitted from each pixel in the first direction, the array direction of the transmissive region and the reflective region is aligned in the second direction perpendicular to the first direction, so that the light emitted from the transmissive region and the light emitted from the reflective region are not separated from each other. Accordingly, a viewer is able to view light emitted from both the transmissive region and the reflective region at any viewing position. As a result, the visible range is no longer reduced by the provision of the transmissive region and the reflective region.

In this case, the optical unit may be a lenticular lens in which a plurality of cylindrical lenses is arranged in the first direction, the cylindrical lenses being disposed in each line in which said pixel sections extend in the second direction corresponding to the longitudinal direction of the cylindrical lens.

Alternatively, the optical unit may be a parallax barrier in which a plurality of slits is arranged in the first direction, the slits being formed for each line in which the pixel sections extend in the second direction corresponding to the longitudinal direction of the slits.

In a second aspect of the invention, an image display device comprises: a light source; a display panel disposed in front of the light source and having a plurality of pixel sections in the form of a matrix, each of the pixel sections including at least a first pixel for displaying an image for the first viewpoint and a second pixel for displaying an image for the second viewpoint, the second pixel being disposed at a position apart from the first pixel in a first direction; and a parallax barrier interposed between the light source and the display panel, the parallax barrier being formed by arranging a plurality of slits for deflecting the light emitted from the light source in the first direction, in which case, the slits are disposed in each line of the pixel sections extending in a second direction perpendicular to the first direction, the second direction being the longitudinal direction of the slits. And, each of the first and second pixels includes a transmissive region for transmitting the light emitted from the light source and passed through slits of the parallax barrier to the front and a reflective region for reflecting the exterior light incident from the front to the front. The transmissive region and the reflective region are arranged in the second direction in each pixel.

In accordance with the second aspect of the invention, the transmissive region and the reflective region make it possible to adjust the intensity of light from the light source according to the intensity of the exterior light, thereby enabling the electric power consumption to be reduced, maintaining a high brightness of the image. Moreover, the parallax barrier allows the light emitted from the light source to be deflected in the first direction, after passing through the respective pixels. However, the array direction of the transmissive region and the reflective region is aligned in the second direction, so that the light emitted from the transmissive region and the light emitted from the reflective region are not separated from each other. Accordingly, a viewer is able to view light emitted from both the transmissive region and the reflective region at any observing position. As a result, the visible range is no longer reduced by the provision of the transmissive region and the reflective region. Moreover, since the parallax barrier is disposed on the rear side of the display panel, the visibility can be enhanced.

In those cases, each of the transmissive region and the reflective region may be divided into a plurality of sub-regions for color different from each other, and sub-regions for the same color are arranged along the first direction. Thus, a color image can be displayed.

Alternatively, each of the transmissive region and the reflective region may be divided into a plurality of sub-regions for color different from each other, and sub-regions for the same color are arranged along the second direction. Thus, a color image can be displayed, using a conventional vertical stripe-shaped color filter.

Further, the first direction may be a horizontal direction of a display plane in which case the image for the first viewpoint may be an image for the left eye and the image for the second viewpoint may be an image for the right eye which has a parallax with respect to the image for the right eye to thereby provide a three-dimensional image. With this structure, as the optical unit emits light output from the pixel for the first viewpoint toward the left eye of a viewer and emits light output from the pixel for the second viewpoint toward the right eye, the viewer can identify a three-dimensional image.

Alternatively, the first direction may be a vertical direction on a display plane. In case where the image display device is mounted in a portable terminal device, for example, this structure can allow a viewer to view the image display device from plural viewpoints different from one another by merely changing the angle of the portable terminal device and to selectively view one of plural images. In case where the plural images have some correlation, particularly, plural images can be switched from one to another for viewing by the simple scheme of changing the viewing angle, so that the usability is improved considerably. As the first direction to separate an image for the first viewpoint and an image for the second viewpoint is the vertical direction of the display plane, the viewer can always view the image for the first viewpoint and the image for the second viewpoint with both eyes. This improves the visibility of the individual images.

The portable terminal device according to the present invention includes the image display device in accordance with the first or second aspect. Such a portable terminal device may be any one of a cellular phone, portable terminal, PDA (Personal Digital Assistance), game machine, digital camera and digital video camera.

The display panel according to the present invention comprises a plurality of pixels in the form of a matrix. And, each pixel includes a transmissive region for transmitting light and a reflective region for reflecting light. Each of the transmissive region and the reflective region is divided into a red sub-region, green sub-region and blue sub-region. And the array direction of the transmissive region and reflective region is the same as that of the red sub-region, the green sub-region and the blue sub-region in each pixel.

The display panel according to the invention is mounted in an image display device, which is equipped with a light source and an optical unit disposed in front of the light source for deflecting an incident light in one direction. The display panel is interposed between the light source and the optical unit, and serves to guide the light emitted from the light source to the optical unit after transmission, as well as to reflect the exterior light incident from the front toward the optical unit. By setting the array direction of the transmissive region and the reflective region in the panel in the direction perpendicular to the direction into which the optical unit deflects the light, the image display device in accordance with the first or second aspect can be realized.

In the image display device according to the present invention, each pixel includes transmissive regions and reflective regions, and therefore, using both the transmitted light from the light source and the reflected light of the exterior light, the electric power consumption can be reduced, maintaining a high brightness of the image. Moreover, the optical unit deflects the light emitted from each pixel in the first direction, and by setting the array direction of the transmissive regions and reflective regions into the second direction perpendicular to the first direction, the light emitted from the transmissive regions and the light emerged from the reflective regions cannot be separated from each other, thereby enabling a wider visible range to be realized.

DETAILED DESCRIPTION OF THE PREFERRED EMBODIMENTS

In the present invention, for example, in a semi-transmissive three-dimensional image display device, pixels for the left eye and pixels for the right eye are periodically arranged either in the array direction of cylindrical lenses in lenticular lenses or in the array direction of slits in parallax barriers. Each pixel includes a transmissive region and a reflective region. And further, a transmissive region and a reflective region in each pixel are periodically arranged either in the longitudinal direction of cylindrical lenses in the lenticular lens or in the longitudinal direction of slits in the parallax barrier.

From this structural arrangement, it follows that the light emerged from the pixel for the left eye and the light emerged from the pixel for the right eye are deflected in the direction of either the left eye or the right eye, whereas the light emerged from the transmissive region and the light emerged from the reflective region in each pixel are not deflected in a direction different from each other, so that they are not separated from each other. As a result, the semi-transmissive three-dimensional image display device according to the invention provides a higher brightness and reduced electric power consumption without any reduction in the three-dimensional visible range, compared with the conventional transmissive three-dimensional image display device.

Figure 10:
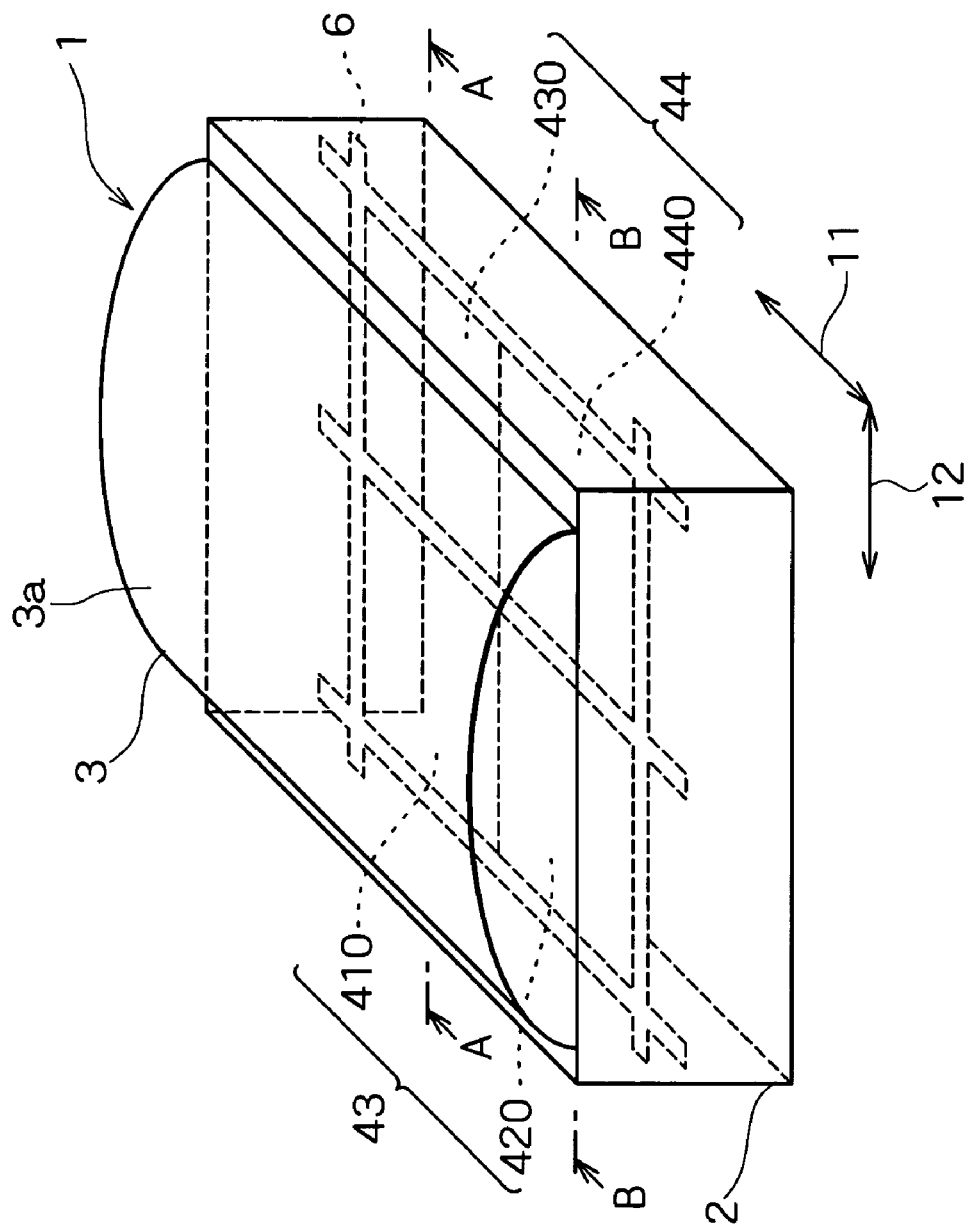
FIG. 10 is a perspective view of a three-dimensional image display device in a first embodiment of the invention.
Figure 11:
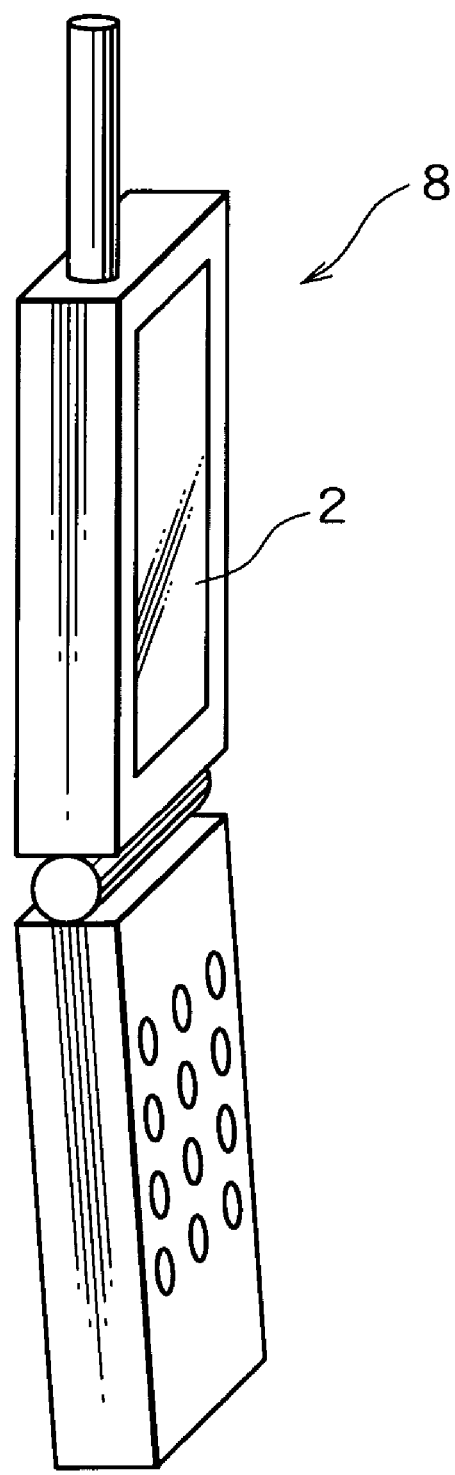
FIG. 11 is a perspective view of a portable terminal device in the embodiment.

Referring now to the accompanying drawings, the preferred embodiments of the invention will be described in a concrete manner. Firstly, a first embodiment of the invention will be described. FIG. 10 is a perspective view of a three-dimensional image display device according to the first embodiment, and FIG. 11 is a perspective view of a portable terminal device according to the first embodiment. FIG. 10 shows a pair of pixels in a liquid crystal display panel and a single cylindrical lens corresponding to the pair of pixels.

As shown in FIG. 10, the three-dimensional image display device 1 according to the first embodiment is equipped with a light source 10 (see FIG. 12), and a semi-transmissive liquid crystal display panel 2 is disposed in the front of the light source 10, i.e., on the side of a viewer. A lenticular lens 3 is disposed in the front surface of the liquid crystal display panel 2. For instance, the light source 10 comprises a light conducting plate (not shown) wherein the semi-transmissive liquid crystal display panel 2 is interposed between the lenticular lens 3 and the light conducting plate; and a sidelight (not shown) disposed on the side of the light conducting plate. In this case, the light emitted from the sidelight is conducted to the semi-transmissive liquid crystal display panel 2 by the light conducting plate, reflecting the light in a direction toward the semi-transmissive liquid crystal display panel 2.

In the semi-transmissive liquid crystal display panel 2, pairs of pixels, each of which is a pixel section having a pixel 43 for the left eye and a pixel 44 for the right eye, are arranged in the form of a matrix in both directions 11 and 12. The direction 11 shown in FIG. 10 is the longitudinal direction of the cylindrical lens 3a in the lenticular lens 3 whereas the direction 12 is the array direction of the cylindrical lens 3a. The pixels 43 for the left eye and the pixels 44 for the right eye are alternately disposed in the direction 12, that is, the direction 12 is identical with a direction from the pixel 43 for the left eye to the pixel 44 for the right eye. In the direction 11, moreover, the pixels 43 for the left eye and the pixels 44 for the right eye are arranged in one line and in another line, respectively. In this case, the array period of the paired pixels in the direction 12 is approximately the same as the array period of the cylindrical lenses. In the array direction, the line along which paired pixels are arranged in the direction 11 is identical with a cylindrical lens 3a. Each of the pixel 43 for the left eye and the pixel 44 for the right eye is delimited by light shield sections 6.

Furthermore, the pixel 43 for the left eye includes a transmissive region 410 and a reflective region 420, and the pixel 44 for the right eye includes a transmissive region 430 and a reflective region 440. The shape of each region 410, 420, 430 or 440 is rectangular. In the longitudinal direction 11 of the cylindrical lens, the transmissive region 410 and the reflective region 420 in the pixel 43 for the left eye are arranged in an alternate repetition, and the transmissive region 430 and the reflective region 440 in the pixel 44 for the right eye are also arranged in an alternate repetition. On the other hand, in the array direction 12 of the cylindrical lens, the transmissive regions 410 and 430 are arranged in an alternate repetition, and the reflective regions 420 and 440 are arranged in an alternate repetition. Moreover, the light emitted from the light source 10 passes through the transmissive regions 410 and 430 in the forward direction. In the reflective regions 420 and 440, a metal film (not shown) made of, for instance, aluminum is formed on the surface in the rear of a glass substrate (not shown) in the liquid crystal display panel 2, with which surface the liquid crystal layer (not shown) is in contact. As a result, the light which comes from the front and passes through the liquid crystal layer of the liquid crystal display panel 2 is reflected by the metal film, and then passes through the liquid crystal layer again, so that it leaves the layer in the forward direction. In this case, each of the regions 410, 420, 430 and 440 has, for instance, the same area.

As shown in FIG. 11, the portable terminal device according to the first embodiment is, for instance, a cellular phone 8 in which a three-dimensional image display device 1 is mounted. The longitudinal direction 11 of the cylindrical lens 3a shown in FIG. 10 is the longitudinal direction or vertical direction of the display plane of the three-dimensional image display device 1, and the array direction 12 of the cylindrical lens 3a is the lateral direction or horizontal direction of the display plane of the three-dimensional image display device 1. In the cellular phone 8, the three-dimensional image display device 1 is activated by a battery (not shown) mounted in the cellular phone 8.

Figure 12:
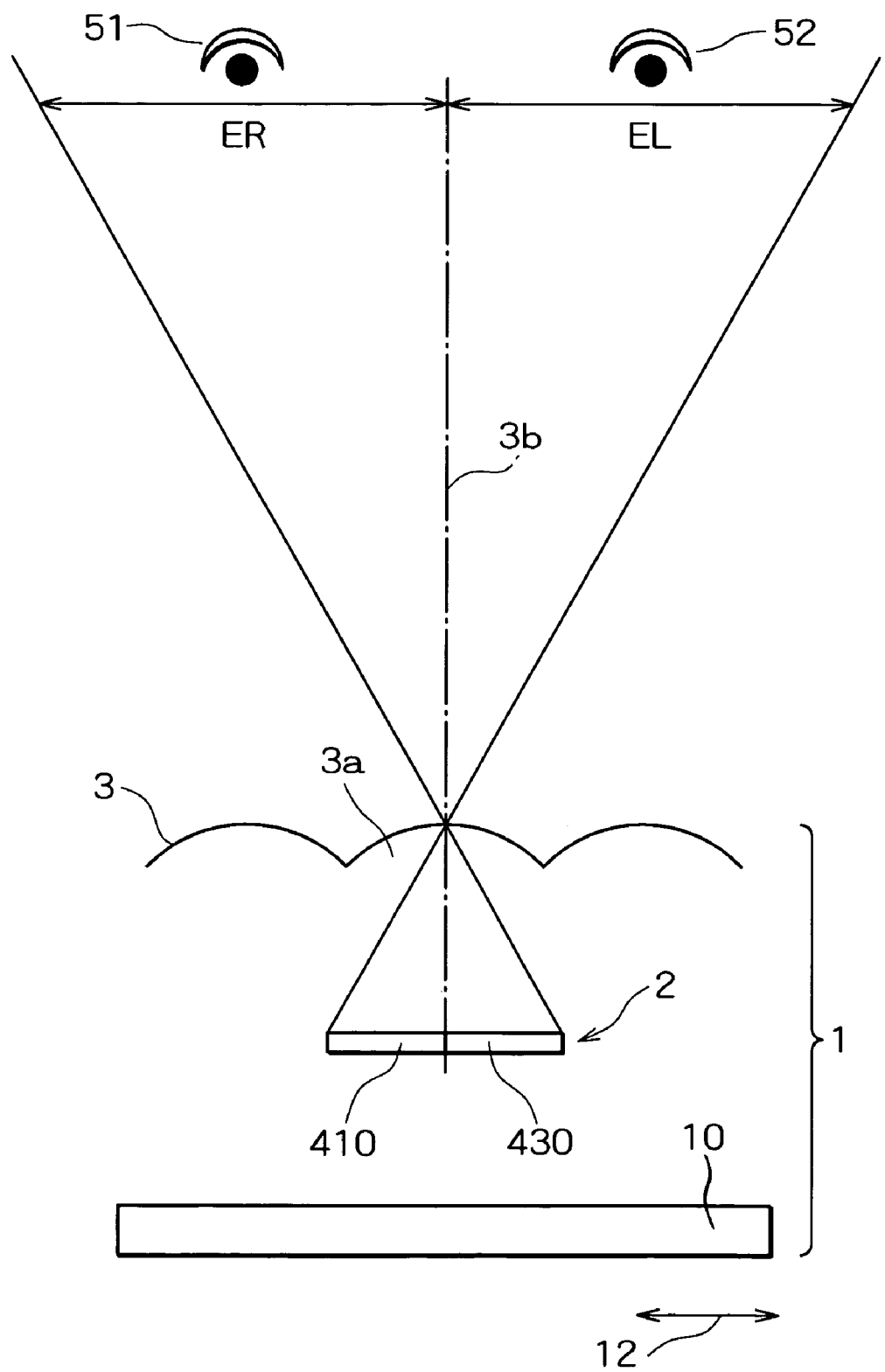
FIG. 12 is a diagram showing the optical model in section viewed from line A-A in FIG. 10.
Figure 13:
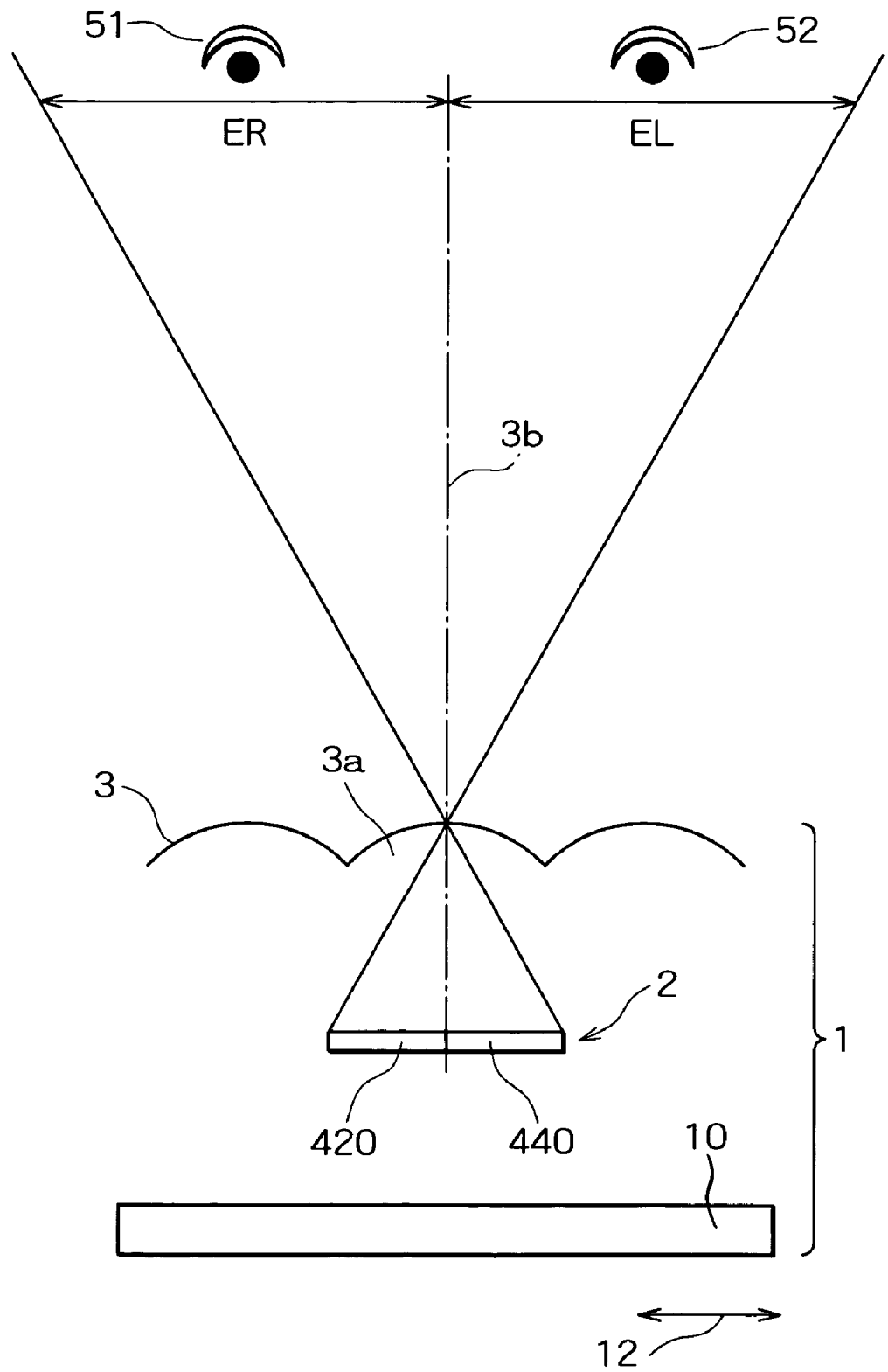
FIG. 13 is a diagram showing the optical model in section viewed from line B-B in FIG. 10.

In the following, the function of the three-dimensional image display device having the above-described structural arrangement according to the first embodiment will be described. FIG. 12 is a diagram showing the optical model in section viewed from line A-A in the three-dimensional image display device shown in FIG. 10, and FIG. 13 is a diagram showing the optical model in section viewed from line B-B in FIG. 10. As shown in FIGS. 10, 12 and 13, a signal is input from an external control unit (not shown) to the liquid crystal display panel 2, so that the pixel 43 for the left eye and the pixel 44 for the right eye produce an image for the left eye and an image for the right eye, respectively.

In this state, the light source 10 is turned on, and the light emitted therefrom is incident on the semi-transmissive liquid crystal display panel 2. The light entering the reflective regions 420 and 440 after incident on the semi-transmissive liquid crystal display panel 2 is intercepted by the metal film, so that the light cannot pass through the liquid crystal display panel 2. On the other hand, the light entering the transmissive regions 410 and 430 passes through the liquid crystal display panel 2, and further it is incident on the lenticular lens 3. The exterior light, such as natural light, illumination light and the like, passes through the lenticular lens 3 from the front, and thereafter incident on the liquid crystal display panel 2. The light entering the transmissive regions 410 and 430 after incident on the liquid crystal display panel 2 passes through the liquid crystal display panel 2 and proceeds in the rear thereof, that is, toward the light source 10, thus providing no contribution to the imaging. On the other hand, the light incident on the reflective regions 420 and 440 passes through the liquid crystal layer in the liquid crystal display panel 2. Thereafter, the light passed though is reflected by the metal film and then again passes through the liquid crystal layer, and further it is incident on the lenticular lens 3.

The light entering the lenticular lens 3 is deflected by each cylindrical lens 3a, and is split into light proceeding in different direction perpendicular to the longitudinal direction 11 of the cylindrical lens 3a. The proceeding direction of each light is inclined toward the direction 12 with respect to the optical axis plane 3b of the cylindrical lens 3a. As a result, the light emerged from the transmissive region 410 and the reflective region 420 in the pixel 43 for the left eye proceeds to an area EL, and the light emerged from the transmissive region 430 and the reflective region 440 in the pixel 44 for the right eye proceeds to an area ER.

In this case, the lenticular lens 3 is a composite structure consisting of cylindrical lenses in a one-dimensional arrangement, as described above, and therefore the lenticular lens 3 provides no lens action in the longitudinal direction 11, that is, no deflection of light in the longitudinal direction 11. Accordingly, the light emerged from both the pixel 43 for the left eye and the pixel 44 for the right eye are split in the array direction 12 of the cylindrical lenses. However, the light emerged from the transmissive region 410 and reflective region 420 in the pixel 43 for the left eye is not split, and travels to the same area EL in the mixed state, and the light emerged from the transmissive region 430 and reflective region 440 in the pixel 44 for the right eye is not split, and travels to the same area ER in the mixed state. As a result, a display independent of the observing position can be obtained, regarding the longitudinal direction 11 of the cylindrical lens. When, therefore, a viewer places his own left eye 52 on the area EL and his own right eye 51 on the area ER, he is able to view a three-dimensional image.

In the case when the three-dimensional image display device is placed in dark surroundings and therefore any image cannot be displayed only with the exterior light, a three-dimensional image can be displayed by turning on the light source 10 and thus by using the transmitted light therefrom and the reflected light of the exterior light. In this case, a brighter image can be maintained independent of the brightness in the surroundings after adjusting the brightness of the image over the entire area, by adjusting the light intensity of the light source 10 in accordance with the light intensity of the exterior light, i.e., either by increasing the light intensity of the light source 10 in a weak intensity of the exterior light or by decreasing the light intensity of the light source 10 in a strong intensity of the exterior light. Furthermore, in the case when the three-dimensional image display device is positioned in sufficient bright surroundings and the light intensity of the exterior light is sufficiently strong to display a three-dimensional image only with the reflected light, the three-dimensional image can be displayed only with the reflected light after turning off the light source 10, thereby enabling the electric power consumption to be reduced. Even in the case when wishing to save the power in the cost of the visibility to some extent, for example, when wishing to have a long time in the display operation after charging, the electric power consumption can be reduced in the operation state of the weakest brightness by using both the transmitted light and the reflected light.

On the contrary, in case of a three-dimensional image display device using only the transmitted light, as described in the non-patent literature 2, the brightness of the image is smaller in an extremely strong light intensity of the exterior light, compared with that in the surroundings, thereby causing the visibility to be reduced. Similarly, in case of a three-dimensional image display device using only the reflected light, the brightness of the image is also smaller in a weak light intensity of the exterior light, thereby causing the visibility to be reduced.

Figure 1:
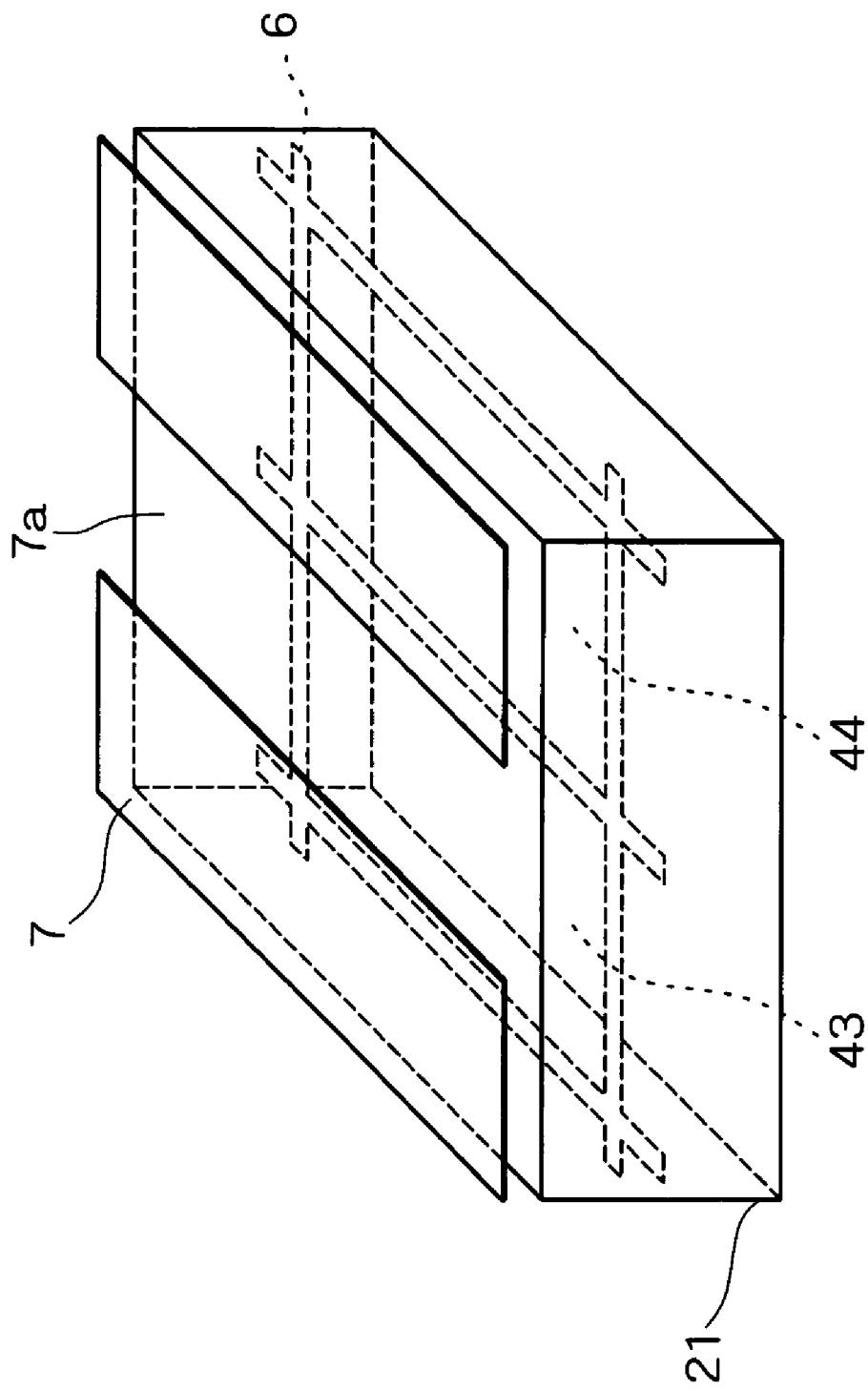
FIG. 1 is a perspective view of a conventional dual eye type three-dimensional image display device, using a parallax barrier.
Figure 2:
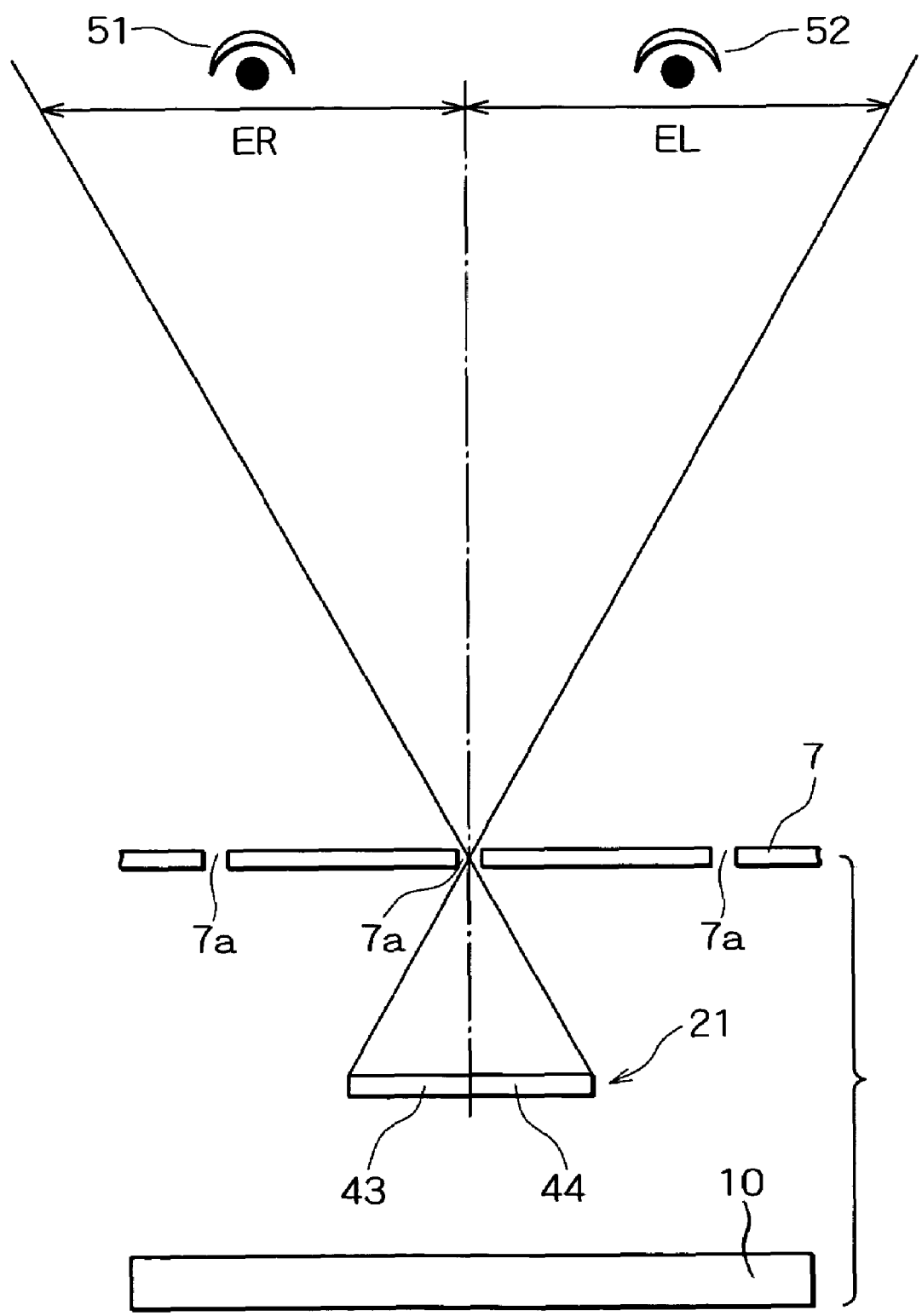
FIG. 2 is a diagram showing the optical model for the three-dimensional image display device in FIG. 1.
Figure 3:
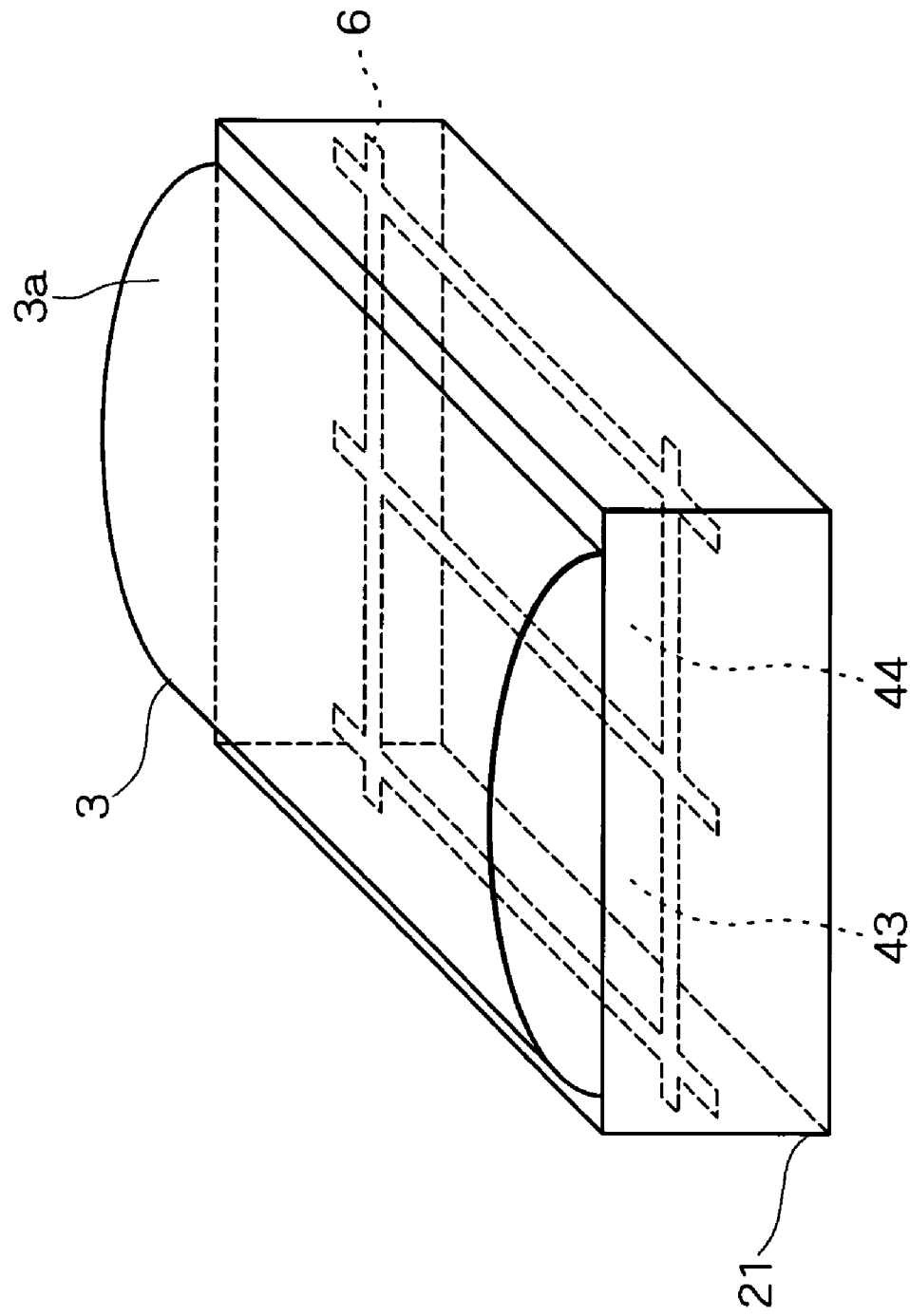
FIG. 3 is a perspective view of a conventional dual eye type three-dimensional image display device, using a lenticular lens.
Figure 4:
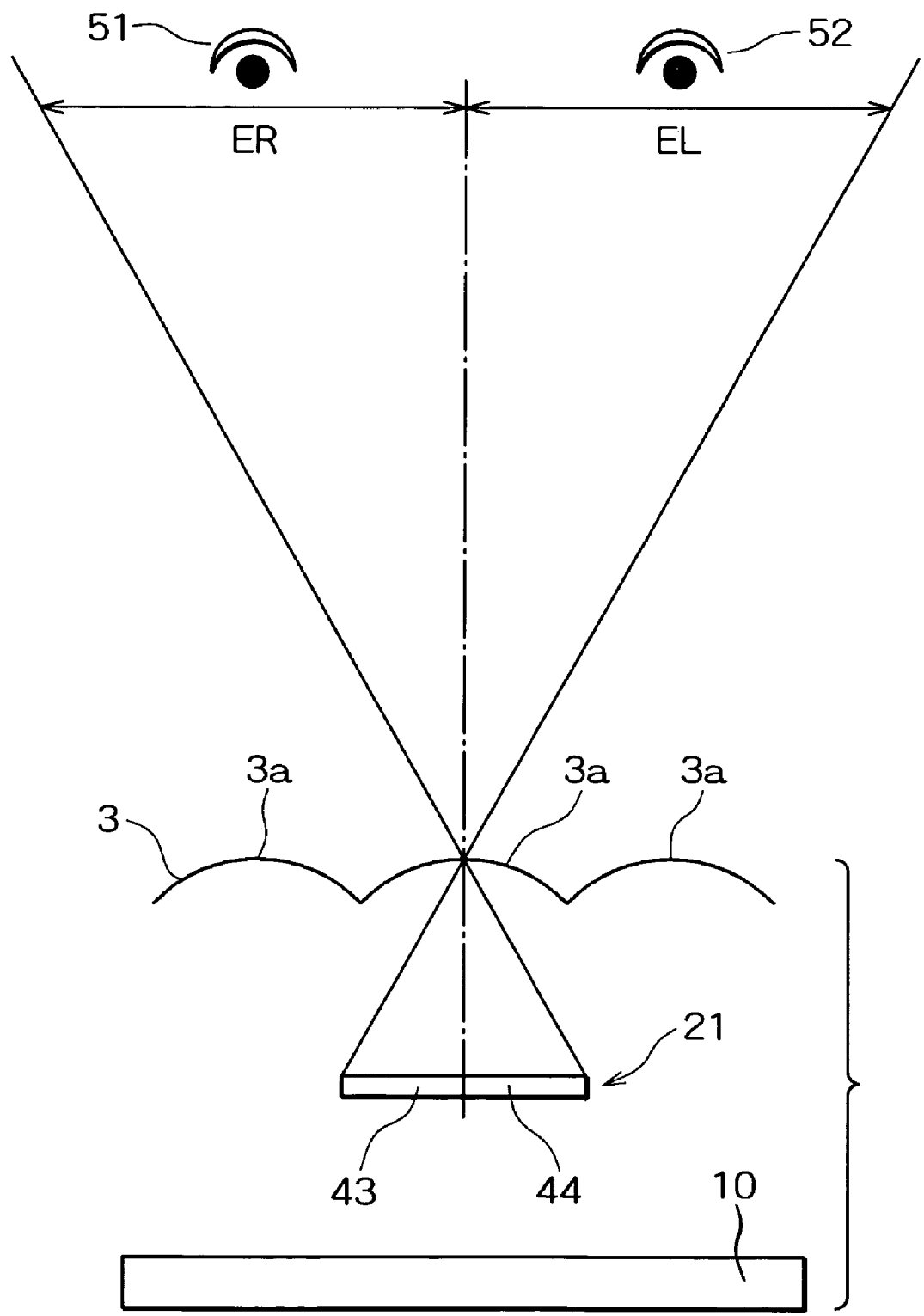
FIG. 4 is a diagram showing the optical model for the three-dimensional image display device in FIG. 3.
Figure 5:
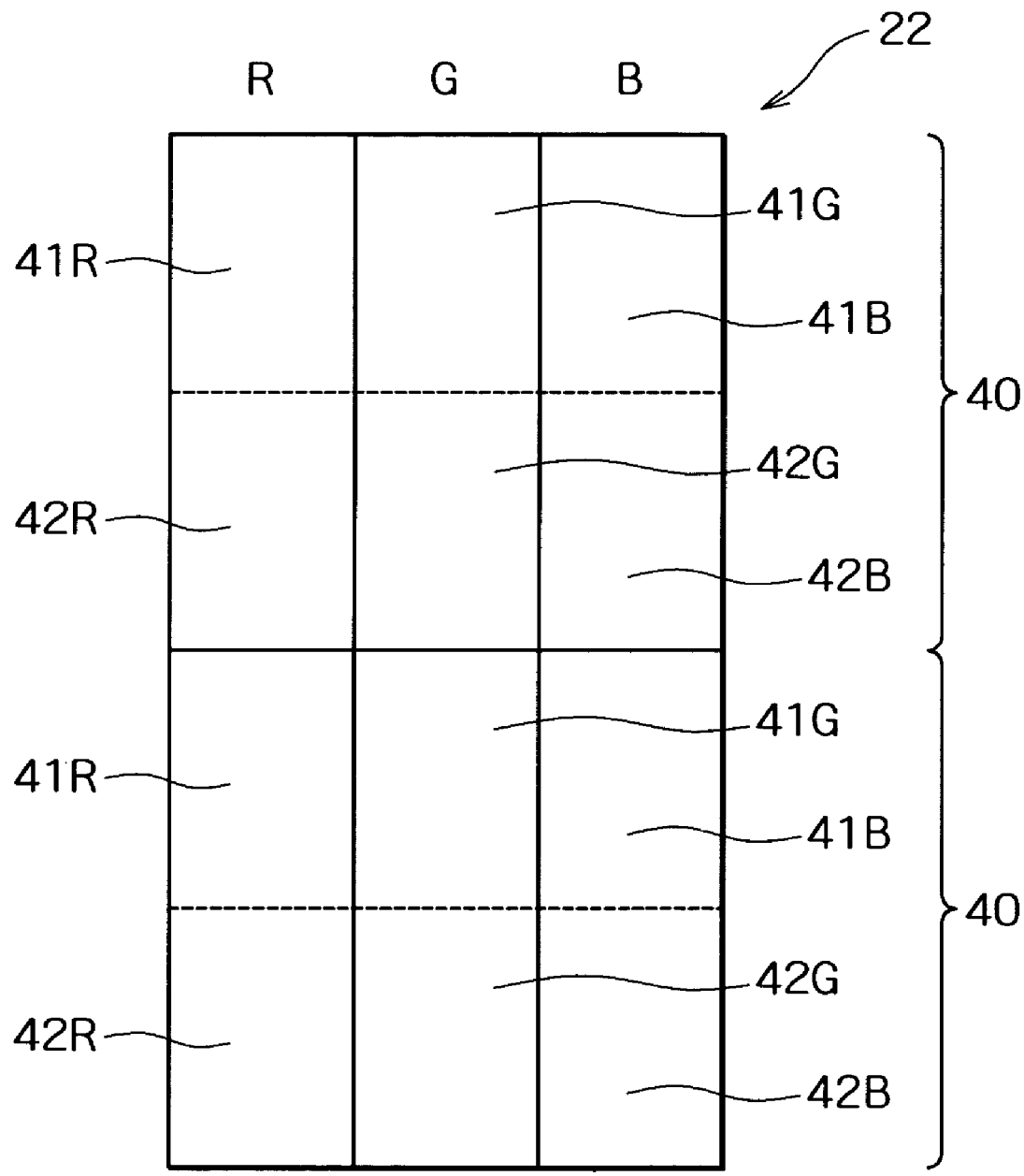
FIG. 5 is a plan view of a conventional semi-transmissive liquid crystal display device.
Figure 6:
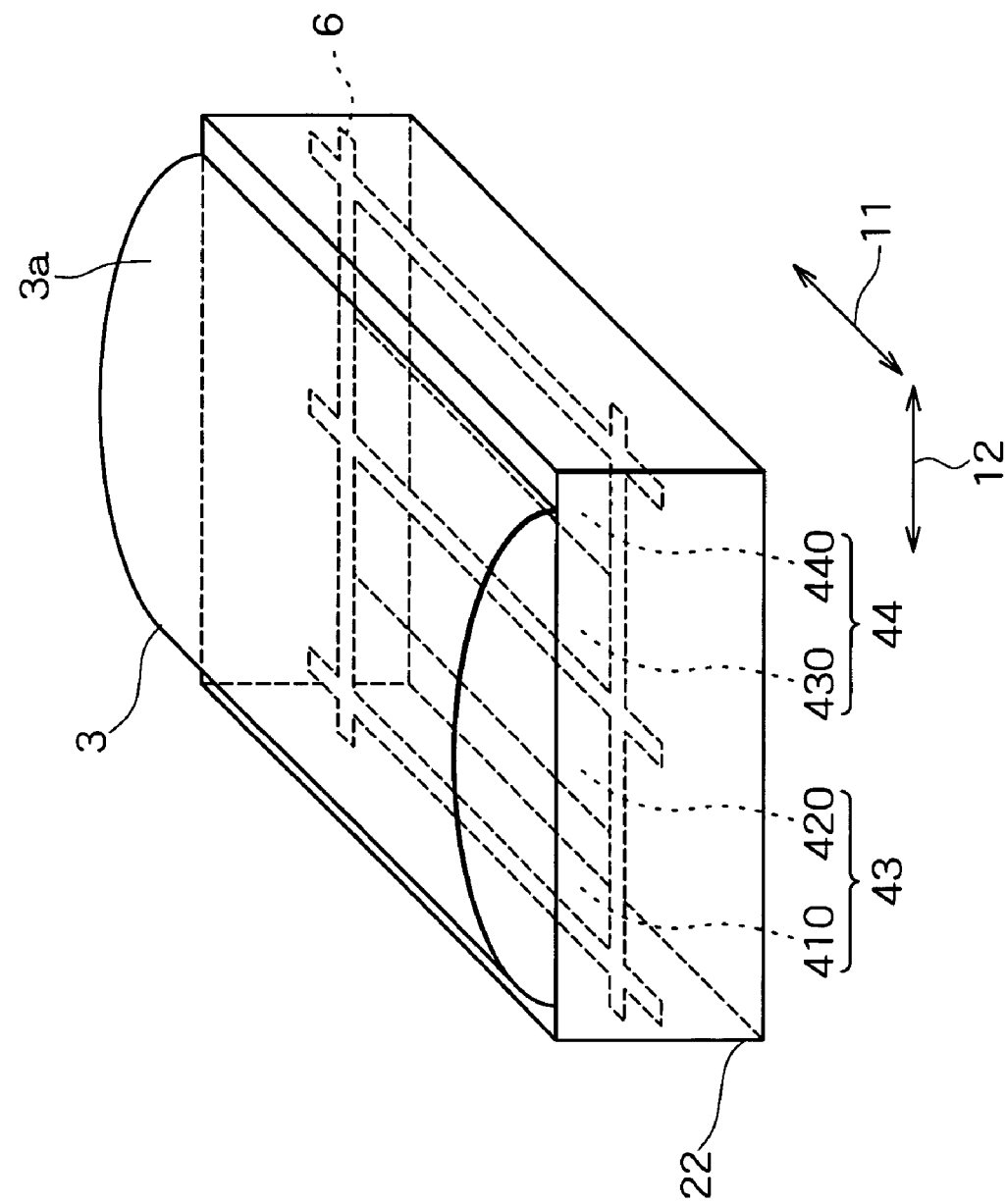
FIG. 6 is a perspective view of a conventional dual eye type three-dimensional image display device in a lenticular lens method, using a semi-transmissive liquid crystal display panel.
Figure 7:
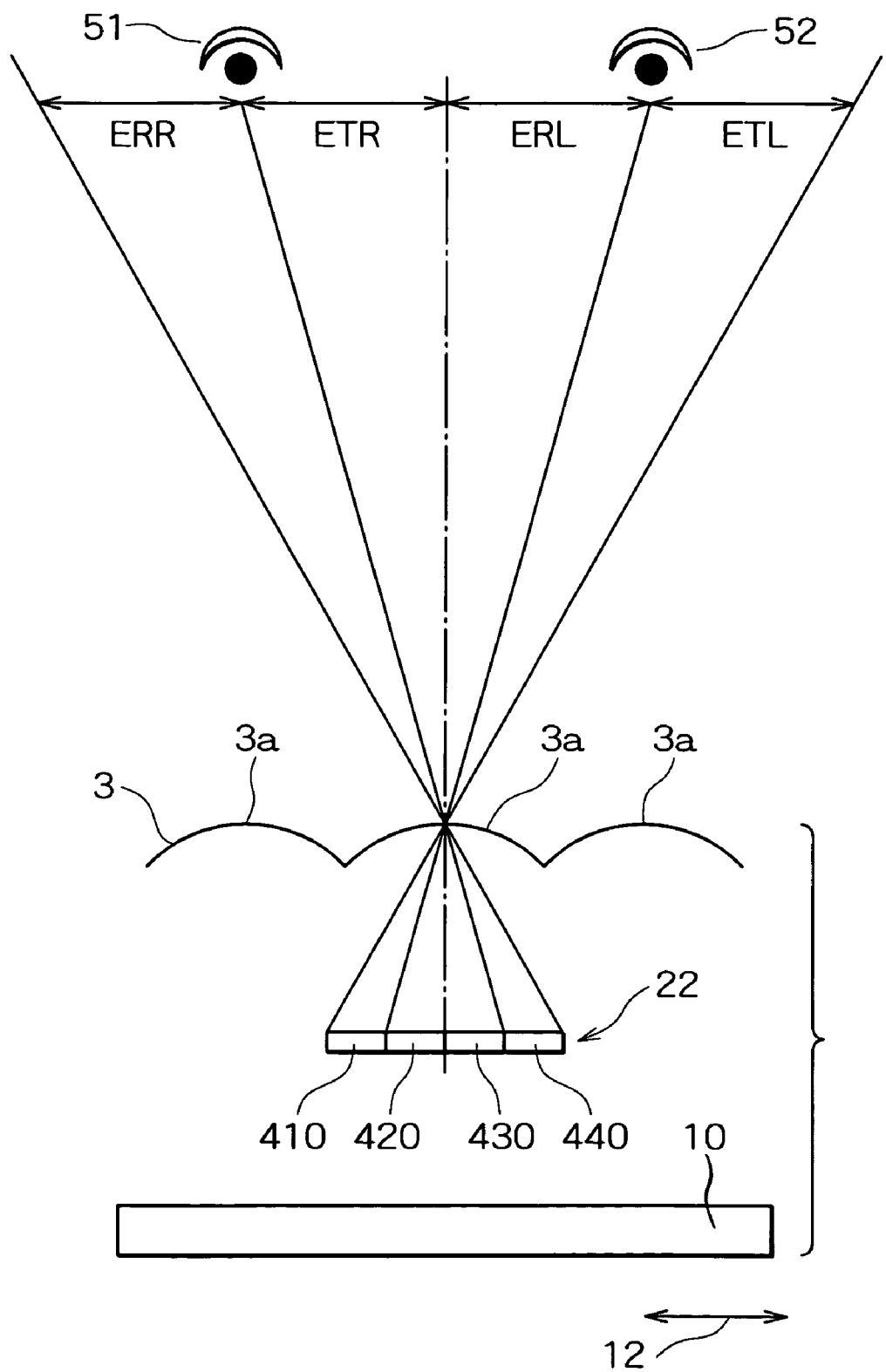
FIG. 7 is a diagram showing the optical model for the three-dimensional image display device in FIG. 6.
Figure 8:
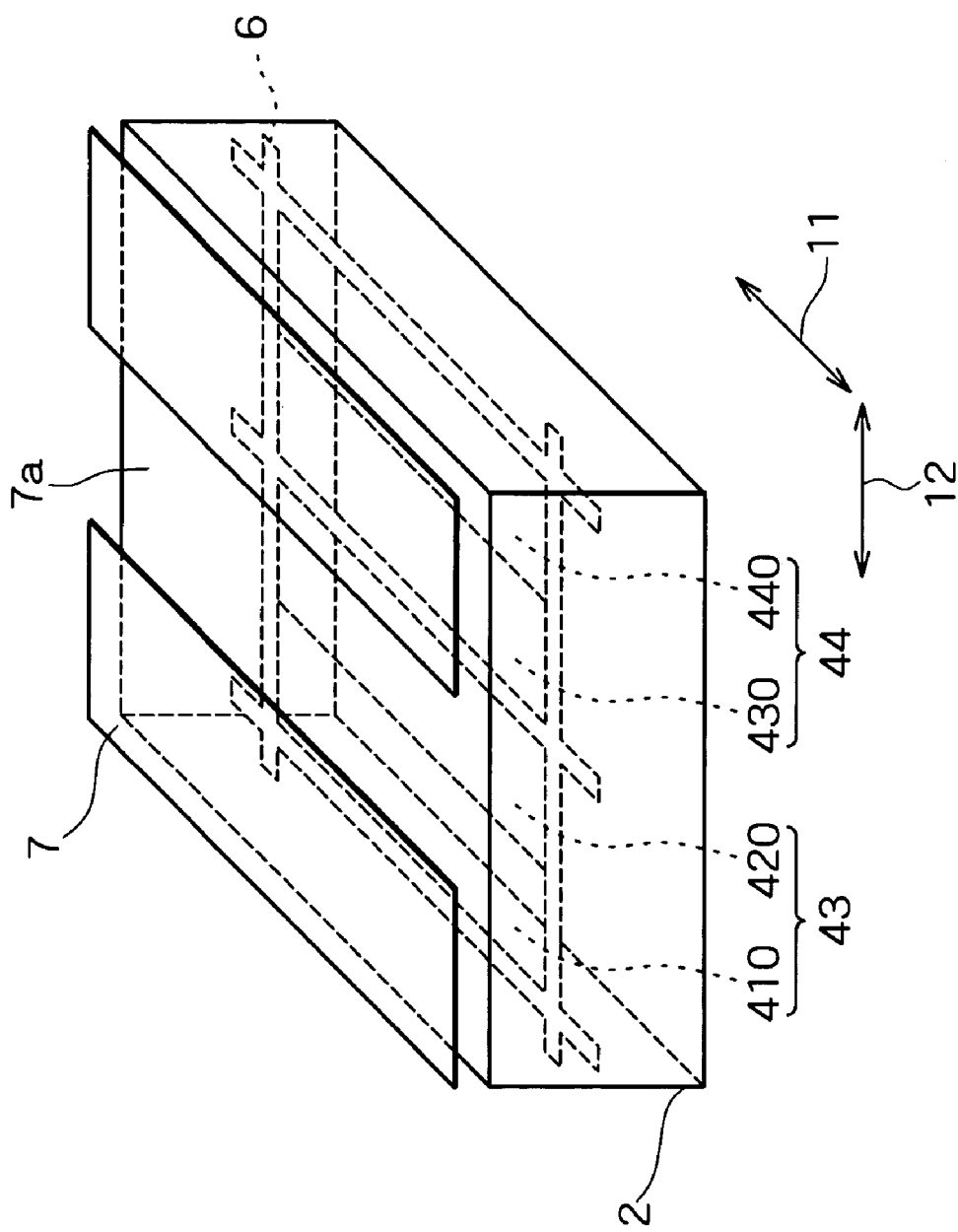
FIG. 8 is a perspective view of a conventional dual eye type three-dimensional image display device in a parallax barrier method, using a semi-transmissive liquid crystal display panel.

As described above, even if the conventional semi-transmissive liquid crystal display panel shown in FIG. 5 is mounted in the conventional three-dimensional image display device shown in FIG. 3, the reflected light and the transmitted light are deflected in directions different from each other, so that the three-dimensional visible range becomes narrow. On the contrary, in the first embodiment of the invention, the reflected light and the transmitted light are not deflected in directions different from each other, so that the three-dimensional visible range no longer becomes narrow.

Accordingly, in the first embodiment of the invention, the three-dimensional image display device provides a wider three-dimensional visible range, and allows a brighter three-dimensional image to be displayed, using both the transmitted light from the light source and the reflected light of the exterior light. Thereby, the power to be supplied to the light source can be saved in bright surroundings having a high brightness in the light intensity, thus enabling the electric power consumption to be reduced. As a result, the cellular phone including a three-dimensional image display device in the first embodiment of the invention ensures a long period operation after charging the battery without increasing the size or capacity thereof.

Hence, the three-dimensional image display device according to the first embodiment is optimally applicable to a portable terminal device, such as cellular phone or the like, and ensures providing a satisfactory three-dimensional image, along with a reduced electric power consumption. If the three-dimensional image display device according to the first embodiment is used in a portable device, an optimal visible range can be found without delay, since the viewer is able to arbitrarily adjust the positional relationship between his own eyes and the display plane, as different from the case when it is mounted in a large-sized display device.

The liquid crystal display panel is applicable to such a portable device, so long as each pixel includes a reflective region and transmissive region, and the applicability is substantially independent of the ratio of the area of the reflective region to that of the transmissive region. In other word, although the semi-transmissive liquid crystal display panel having the area ratio of the reflective region to the transmissive region being 1:1 is described, the area ratio of the transmissive region to the reflective region in the first embodiment of the invention can be specified to be, for example, 6:4. Either as for a slight-reflective liquid crystal display panel having a greater area of the transmissive region relative to that of the reflective region or as for a slight-transmissive liquid crystal display panel having a greater area of the reflective region relative to that of the transmissive region, the structural arrangement according to the first embodiment of the invention is similarly applicable.

Furthermore, electrodes for the pixels can be activated either with an active matrix method, such as the TFT (Thin Film Transistor) activating method, the TFD (Thin Film Diode) activating method, or with a passive matrix method, such as the STN (Super Twisted Nematic Liquid Crystal) method or the like. The display panel may be of any type which has a transmissive region and a reflective region provided for each pixel and is not limited to the liquid crystal display panel.

The dual eye three-dimensional image display device, which has only a pixel for the left eye and a pixel for the right eye, is exclusively explained in the above description of the first embodiment. However, the present invention is also applicable to an N-eye type three-dimensional image display device (N is an integer greater than 2).

Moreover, in the first embodiment of the invention, a color image can be displayed with the time-sharing method.

Moreover, the portable terminal device according to the first embodiment of the invention is not restricted to the cellular phone, but is also applicable to a portable terminal appliance, such as portable terminal, PDA, game machine, digital camera, digital video camera or the like.

Figure 14:
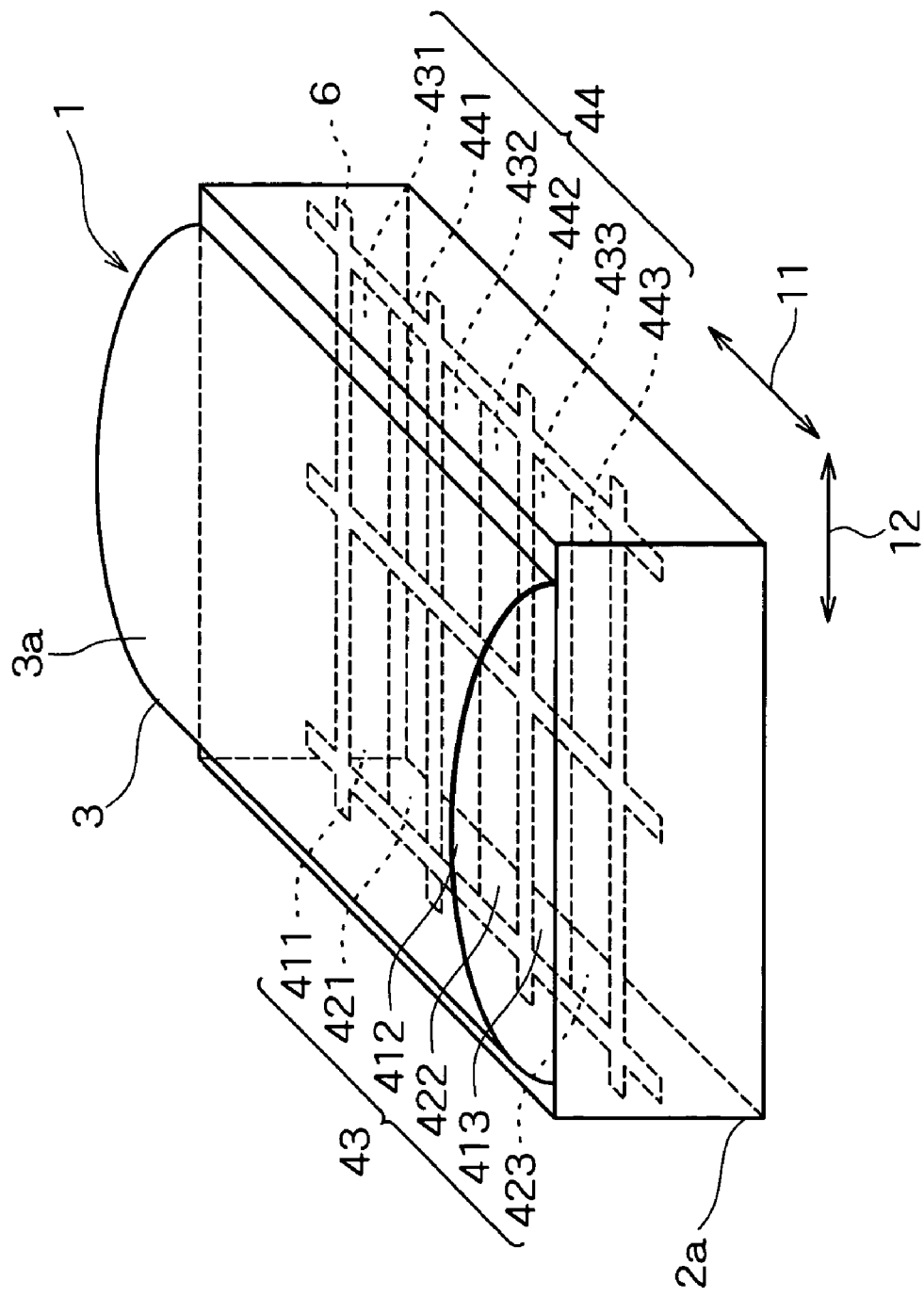
FIG. 14 is a perspective view of a three-dimensional image display device in a second embodiment of the invention.

In the following, a second embodiment of the invention will be described. FIG. 14 is a perspective view of a three-dimensional image display device according to the second embodiment. As shown in FIG. 14, compared with the first embodiment, the second embodiment is characterized in that a color display means comprising color filters and others is added to the semi-transmissive liquid crystal display panel. The same color sections of such color filters are arranged such that they are repeatedly disposed in the array direction 12 of the cylindrical lenses 3a.

For instance, in a pixel 43 for the left eye, a transmissive region in the pixel for the left eye (red) 411, reflective region in the pixel for the left eye (red) 421, transmissive region in the pixel for the left eye (green) 412, reflective region in the pixel for the left eye (green) 422, transmissive region in the pixel for the left eye (blue) 413 and reflective region in the pixel for the left eye (blue) 423 are disposed in this order in the longitudinal direction 11 of the cylindrical lenses 3a.

Also, in a pixel 44 for the right eye, a transmissive region in the pixel for the right eye (red) 431, reflective region in the pixel for the right eye (red) 441, transmissive region in the pixel for the right eye (green) 432, reflective region in the pixel for the right eye (green) 442, transmissive region in the pixel for the right eye (blue) 433 and reflective region in the pixel for the right eye (blue) 443 are disposed in this order in the longitudinal direction 11.

In conjunction with this, a red color filter (not shown) in the form of a stripe is disposed in the transmissive region in the pixel for the left eye (red) 411, reflective region in the pixel for the left eye (red) 421, the transmissive region in the pixel for the right eye (red) 431, and reflective region in the pixel for the right eye (red) 441. A green color filter (not shown) in the form of a stripe is disposed in the transmissive region in the pixel for the left eye (green) 412, reflective region in the pixel for the left eye (green) 422, the transmissive region in the pixel for the right eye (green) 432, and reflective region in the pixel for the right eye (green) 442. Furthermore, a blue color filter (not shown) in the form of a stripe is disposed in the transmissive region in the pixel for the left eye (blue) 413, the reflective region in the pixel for the left eye (blue) 423, the transmissive region in the pixel for the right eye (blue) 433, and the reflective region in the pixel for the right eye (blue) 443. Each of these color filters extends in the direction 12. The structural arrangement and the function of the three-dimensional image display device according to the second embodiment are the same as those according to the first embodiment.

In accordance with the second embodiment of the invention, a three-dimensional image display device capable of carrying out the color display with a wider three-dimensional visible range and reduced electric power consumption, using the transmitted light and reflected light can be obtained, and a portable information terminal including such a three-dimensional display device can also be obtained. The advantages other than the above in the second embodiment are the same as those in the first embodiment.

Moreover, the color arrangement in the second embodiment is specified only in an example, and therefore the present invention is not restricted to such an order of arrangement.

In the second embodiment, the dual eye type three-dimensional image display device is explained. However, the structural arrangement employed therein in accordance with the second embodiment is also applicable to an N-eye type three-dimensional image display device (N is an integer greater than 2).

Figure 15:
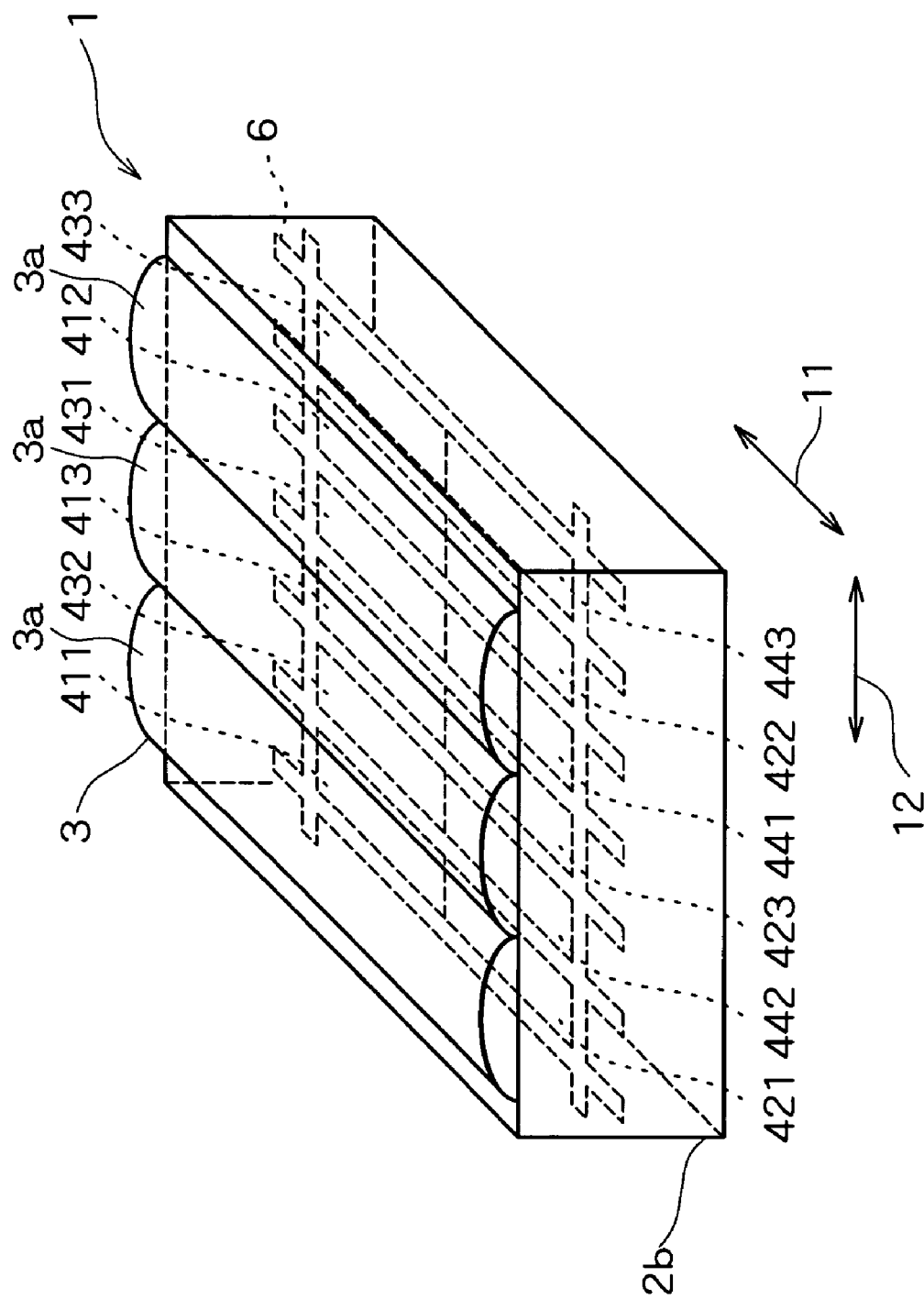
FIG. 15 is a perspective view of a three-dimensional image display device in a third embodiment of the invention.

In the following, a third embodiment of the invention will be described. FIG. 15 is a perspective view of a three-dimensional image display device according to the third embodiment. As shown in FIG. 15, compared with the second embodiment, the third embodiment is characterized in that the transmissive region and reflective region for the same color are disposed in the longitudinal direction 11 of cylindrical lenses in a semi-transmissive liquid crystal display panel 2b. For instance, in a cylindrical lens 3a for a lenticular lens 3, a transmissive region in the pixel for the left eye (red) 411 and reflective region in the pixel for the left eye (red) 421 are disposed in the longitudinal direction 11 of the cylindrical lens, and adjacent to the regions thus arranged in a line, a transmissive region in the pixel for the right eye (green) 432 and reflective region in the pixel for the right eye (green) 442 are further disposed in the longitudinal direction 11. In other words, four regions, i.e., the transmissive region in the pixel for the left eye (red) 411, reflective region in the pixel for the left eye (red) 421, transmissive region in the pixel for the right eye (green) 432 and reflective region in the pixel for the right eye (green) 442 pertain to the cylindrical lens 3a.

In another adjacent cylindrical lens 3a, a transmissive region in the pixel for the left eye (blue) 413, reflective region in the pixel for the left eye (blue) 423, transmissive region in the pixel for the right eye (red) 431 and reflective region in the pixel for the right eye (red) 441 are similarly arranged. Furthermore, in further another adjacent cylindrical lens 3a, a transmissive region in the pixel for the left eye (green) 412, reflective region in the pixel for the left eye (green) 422, transmissive region in the pixel for the right eye (blue) 433 and reflective region in the pixel for the right eye (blue) 443 are similarly arranged. A set of the above three cylindrical lenses 3a constitutes a pixel section. The structural arrangement and function other than the above in the third embodiment are the same as those in the second embodiment.

In the conventional two-dimensional panel display device, color filters are arranged in the vertical direction similar to the display device according to the third embodiment, i.e., in the form of a stripe extending in the longitudinal direction 11 of the cylindrical lens. Therefore, the color three-dimensional image display device according to the third embodiment is compatible with the color display device including the conventional color filters in the form of vertical stripes, and provides a wider three-dimensional visible range using both the transmitted light and the reflected light. The structural arrangement, function and advantages other than the above in the third embodiment are the same as those in the second embodiment.

In the third embodiment, the dual eye type three-dimensional display device is described. However, the third embodiment is also applicable to an N-eye type three-dimensional display device (N is an integer greater than 2).

Figure 16:
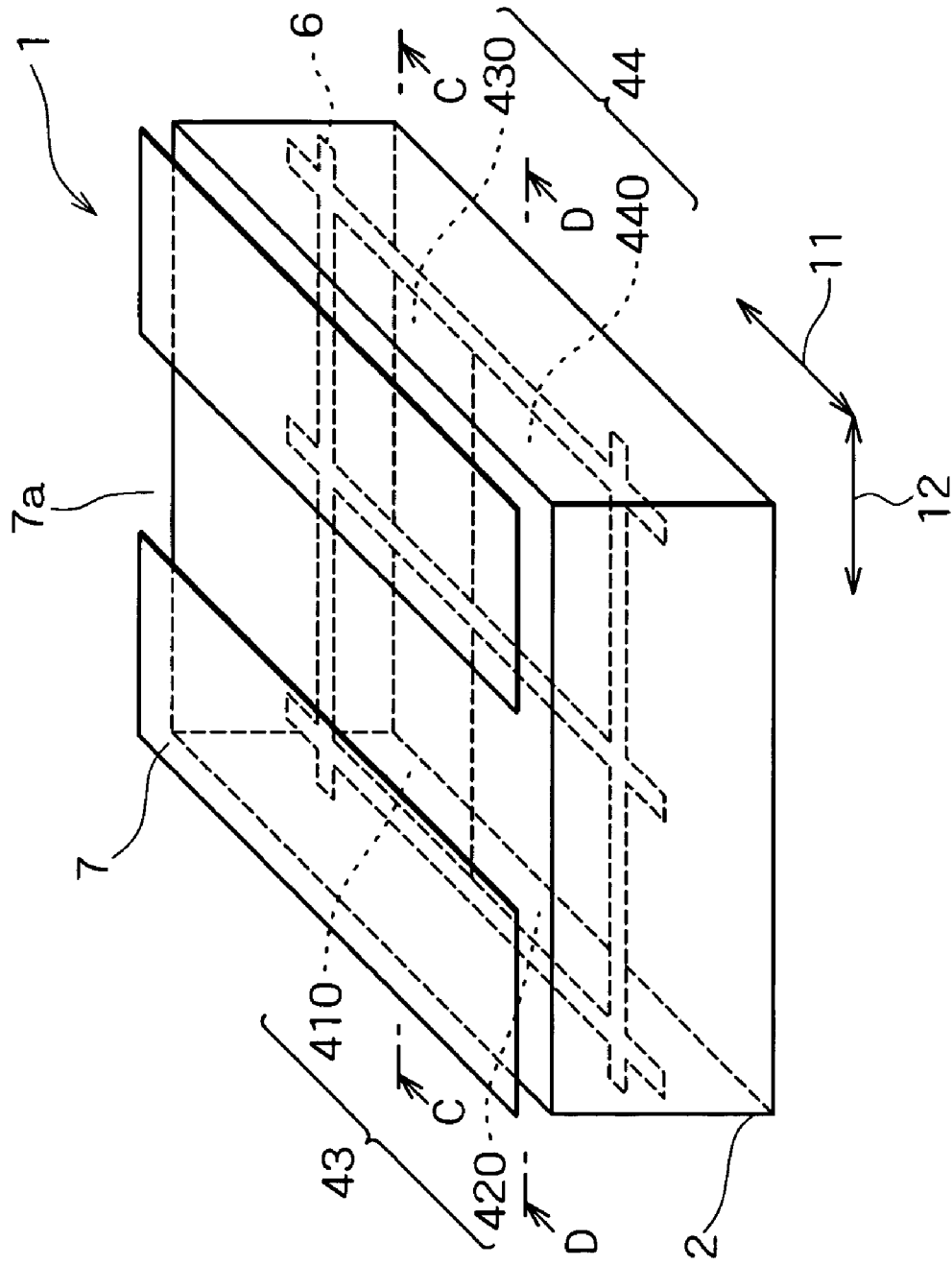
FIG. 16 is a perspective view of a three-dimensional image display device in a fourth embodiment of the invention.

In the following, a fourth embodiment of the invention will be described. FIG. 16 is a perspective view of a three-dimensional image display device according to the fourth embodiment. As shown in FIG. 16, the fourth embodiment is different from the first embodiment in the following point: Instead of the lenticular lens 3 (see FIG. 10), a parallax barrier 7 is disposed in front of a semi-transmissive liquid crystal display panel 2. In the parallax barrier 7, a metal film is deposited, for instance, on the surface of a glass substrate, and slits 7a are formed in the metal film by structuring the metal film so as to remove partial areas therefrom. In the longitudinal direction 11 of the slits 7a in the parallax barrier 7, transmissive regions 410 and reflective regions 420 of the pixel 43 for the left eye are alternately disposed, and transmissive regions 430 and reflective regions 440 in the pixel 44 for the right eye are also alternately disposed. Moreover, in the array direction 12 of the slits 7a, transmissive regions 410 and 430 are alternately disposed, and reflective regions 420 and 440 are also alternately disposed. The structural arrangement other than the above in the fourth embodiment is the same as that in the first embodiment.

Figure 17:
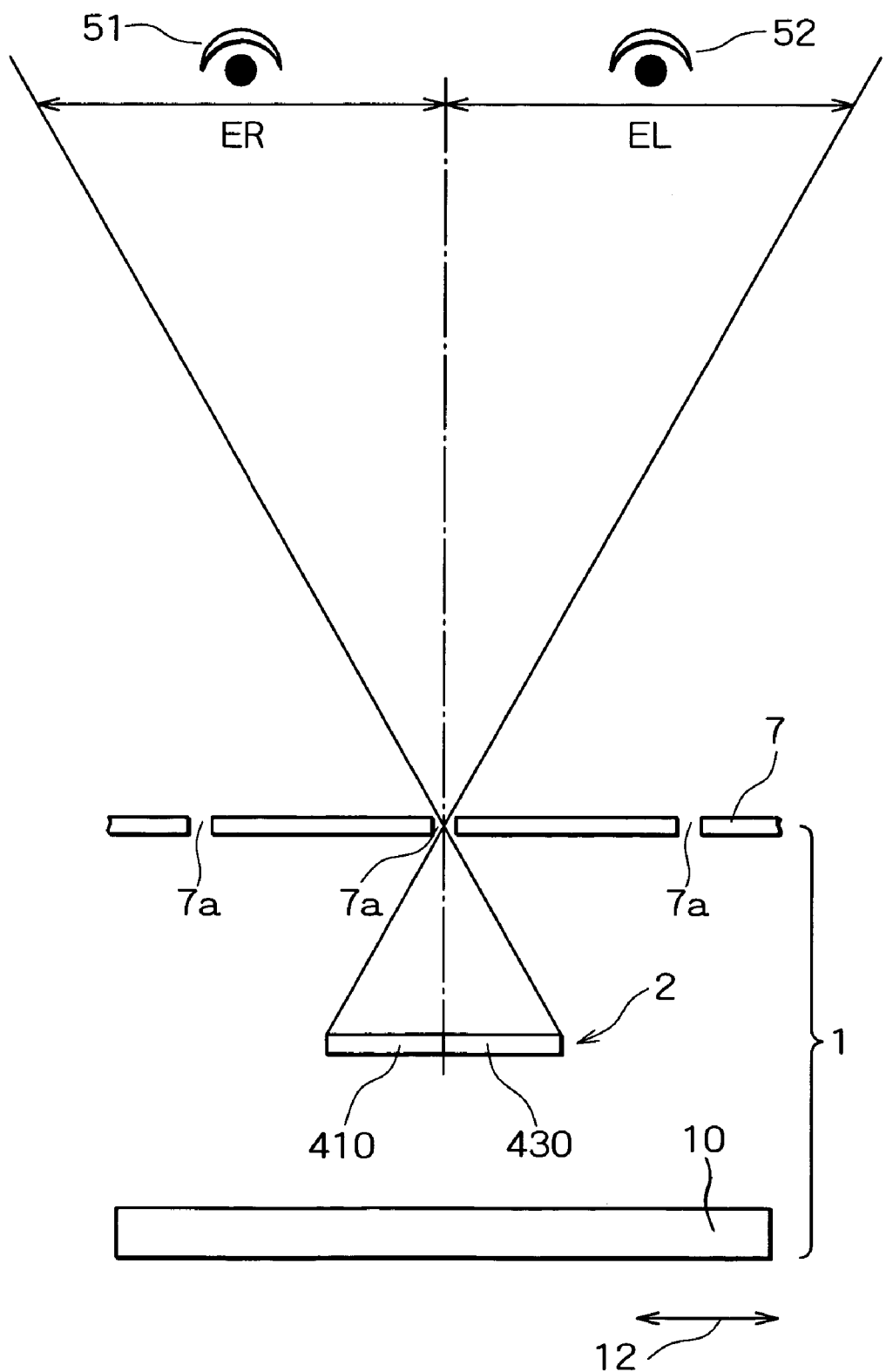
FIG. 17 is a diagram showing the optical model in section viewed from line C-C in FIG. 16.
Figure 18:
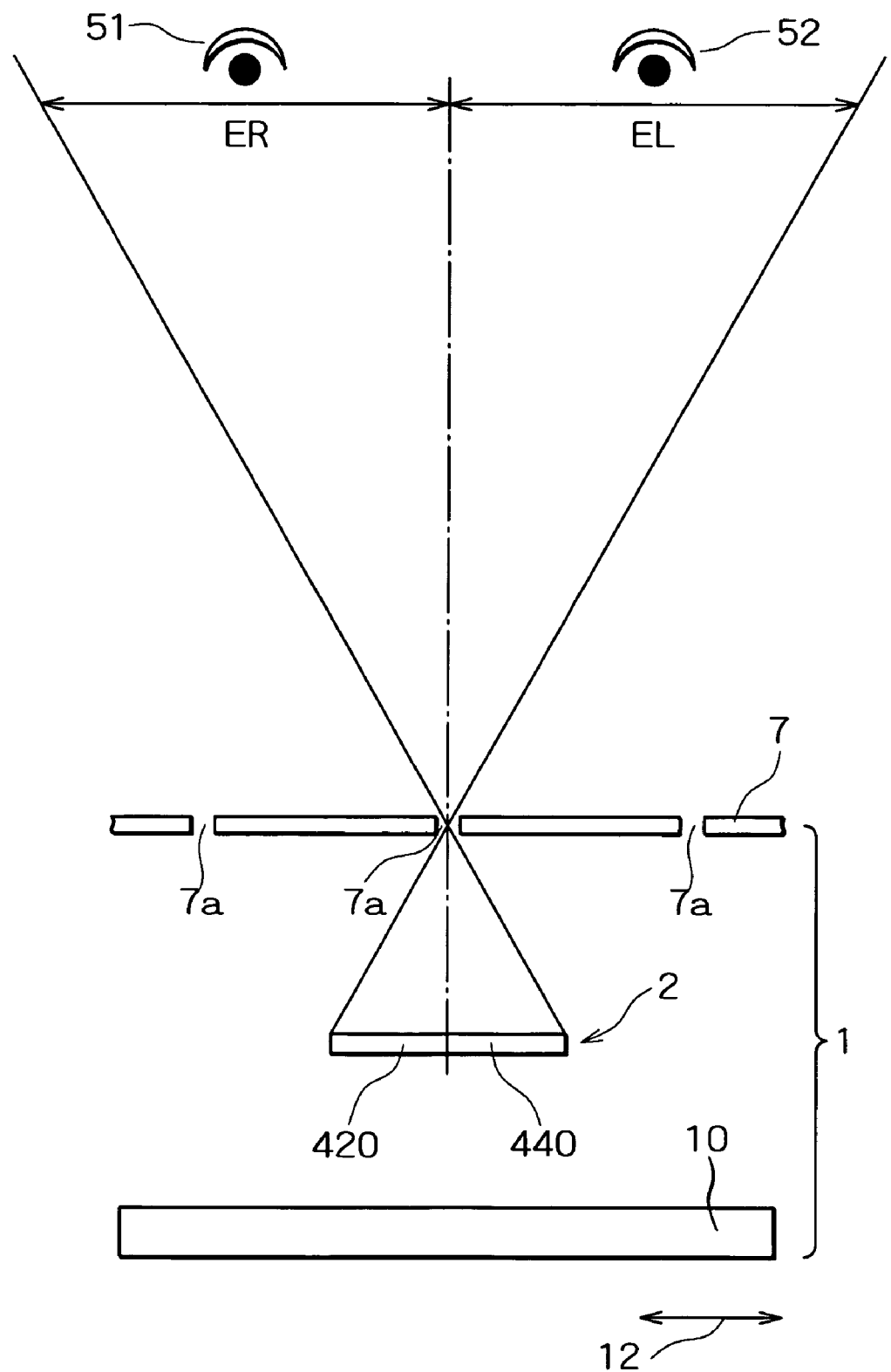
FIG. 18 is a diagram showing the optical model in section viewed from line D-D in FIG. 16.

Next, the function of the three-dimensional image display device according the fourth embodiment will be described. FIG. 17 is a diagram showing the optical model of the three-dimensional image display device in section viewed from line C-C in FIG. 16, and FIG. 18 is a diagram showing the optical model of the three-dimensional image display device in section viewed from line D-D in FIG. 16. In this case, a decreased width of the slit 7a provides a reduced intensity of light passed through the slit 7a, thereby causing the display to be darkened. In view of this fact, the slit 7a is designed so as to have a predetermined width. Actually, an image for the right eye and an image for the left eye overlap each other to some extent. However, in the following description, the overlapping of the images due to the width of the slit 7a is omitted for the sake of simplicity.

As shown in FIG. 17, the light emitted from a light source 10 turned on is incident on the semi-transmissive liquid crystal display panel 2. In the semi-transmissive liquid crystal display panel 2, the light incident on a transmissive region 410 in the pixel for the left eye and the light incident on a transmissive region 430 in the pixel for the right eye pass respectively through the corresponding regions, and then enter the parallax barrier 7. Part of the light is intercepted when the light passes through the slit 7a in the parallax barrier 7. Thereafter, the light passed through the transmissive region 410 in the pixel for the left eye travels to an area EL and the light passed through the transmissive region 430 in the pixel for the right eye travels to an area ER. In the semi-transmissive liquid crystal display panel 2, furthermore, the light incident on the reflective region 420 in the pixel for the left eye and the light incident on the reflective region 440 in the pixel for the right eye are intercepted by metal films (not shown) that are disposed in these regions.

On the other hand, as shown in FIG. 18, the exterior light enters the semi-transmissive liquid crystal display panel 2 from the front side, after passing through the slit 7a. In the semi-transmissive liquid crystal display panel 2, the light incident on the reflective region 420 in the pixel for the left eye and the light incident on the reflective region 440 in the pixel for the right eye pass though the corresponding liquid crystal layers (not shown) in these regions, and then reflected by the corresponding metal films (not shown). Thereafter, they again pass through the liquid crystal layers and then travel to the parallax barrier 7. Part of the light is intercepted when passing through the slit 7a in the parallax barrier 7, and the light emerged from the reflective region 420 in the pixel for the left eye travels to the area EL and the light emerged from the reflective region 440 in the pixel for the right eye travels to the area ER. The exterior light, which is incident on the transmissive region 410 in the pixel for the left eye and the transmissive region 430 in the pixel for the right eye, passes through these regions and then travels to the light source 10, thereby providing no contribution to the imaging.

When, therefore, a viewer places his own left eye 52 on the area EL and his own right eye 51 on the area ER, he is able to view a three-dimensional image resulting from both the transmitted light and the reflected light.

The slits 7a formed in the parallax barrier 7 have a one-dimensional shape, and therefore provide no effect of shielding light in the longitudinal direction 11. As a result, a display independent of the observing position can be obtained in the direction 11. Accordingly, the light emerged from the transmissive region 410 in the pixel for the left eye and the light emerged from the reflective region 420 in the pixel for the left eye are not deflected in directions different from each other, and also the light emerged from the transmissive region 430 in the pixel for the right eye and the light emerged from the reflective region 440 in the pixel for the right eye are not deflected in directions different from each other. As a result, a three-dimensional visible range is not reduced, even if each pixel has such a transmissive region and reflective region.

Figure 9:
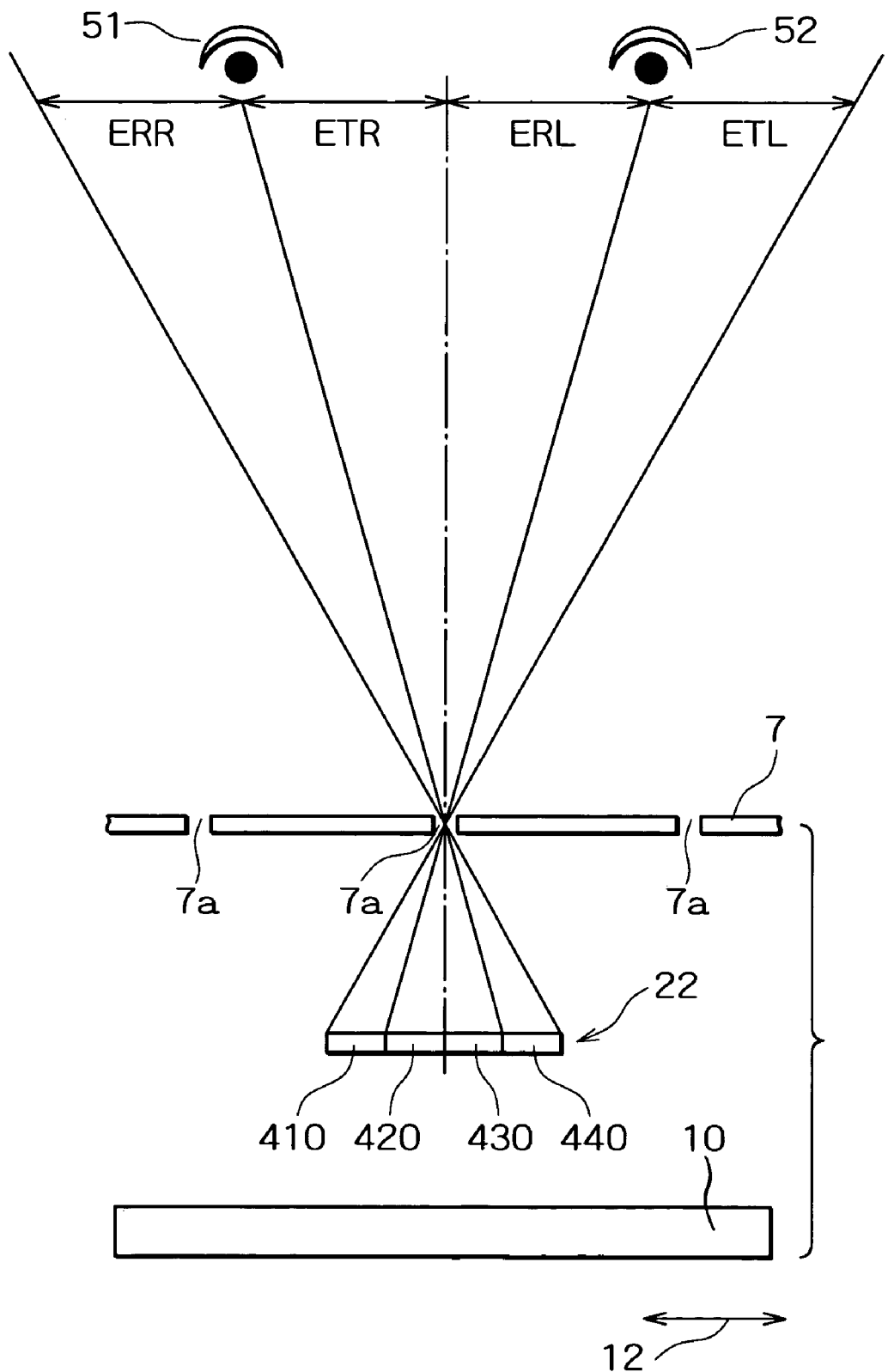
FIG. 9 is a diagram showing the optical model for the three-dimensional image display device in FIG. 8.

In the fourth embodiment, therefore, a three-dimensional display can be viewed, if the viewer places his own left eye 52 on the area EL and his own right eye 51 on the area ER. In this case, the three-dimensional visible range, in which a three-dimensional image can be viewed, is larger than each of the areas ETL, ETR, ERL and ERR, which are shown in FIG. 9. In the fourth embodiment, therefore, a three-dimensional image display device capable of providing a wider three-dimensional visible range can be realized, and an increased brightness is ensured, using the transmitted light and the reflected light, along with a reduced electric power consumption.

In the fourth embodiment, the parallax barrier 7 is used instead of the lenticular lens, so that the fringe resulting from the surface reflection of the lens is suppressed, and therefore a reduction in the image quality of the display can be avoided. The advantages other than the above in the fourth embodiment are the same as those in the first embodiment.

In the fourth embodiment, each pixel can be divided into regions for respective colors, using color filters, as similarly to the above-described second or third embodiment. Using this method, a color image can be displayed. Furthermore, the color display can also be realized with the time-sharing method.

In the fourth embodiment, the dual eye type three-dimensional image display device is described. However, the fourth embodiment is also applicable to an N-eye type three-dimensional image display device (N is an integer greater than 2), as similarly to the above-described first to third embodiments.

Figure 19:
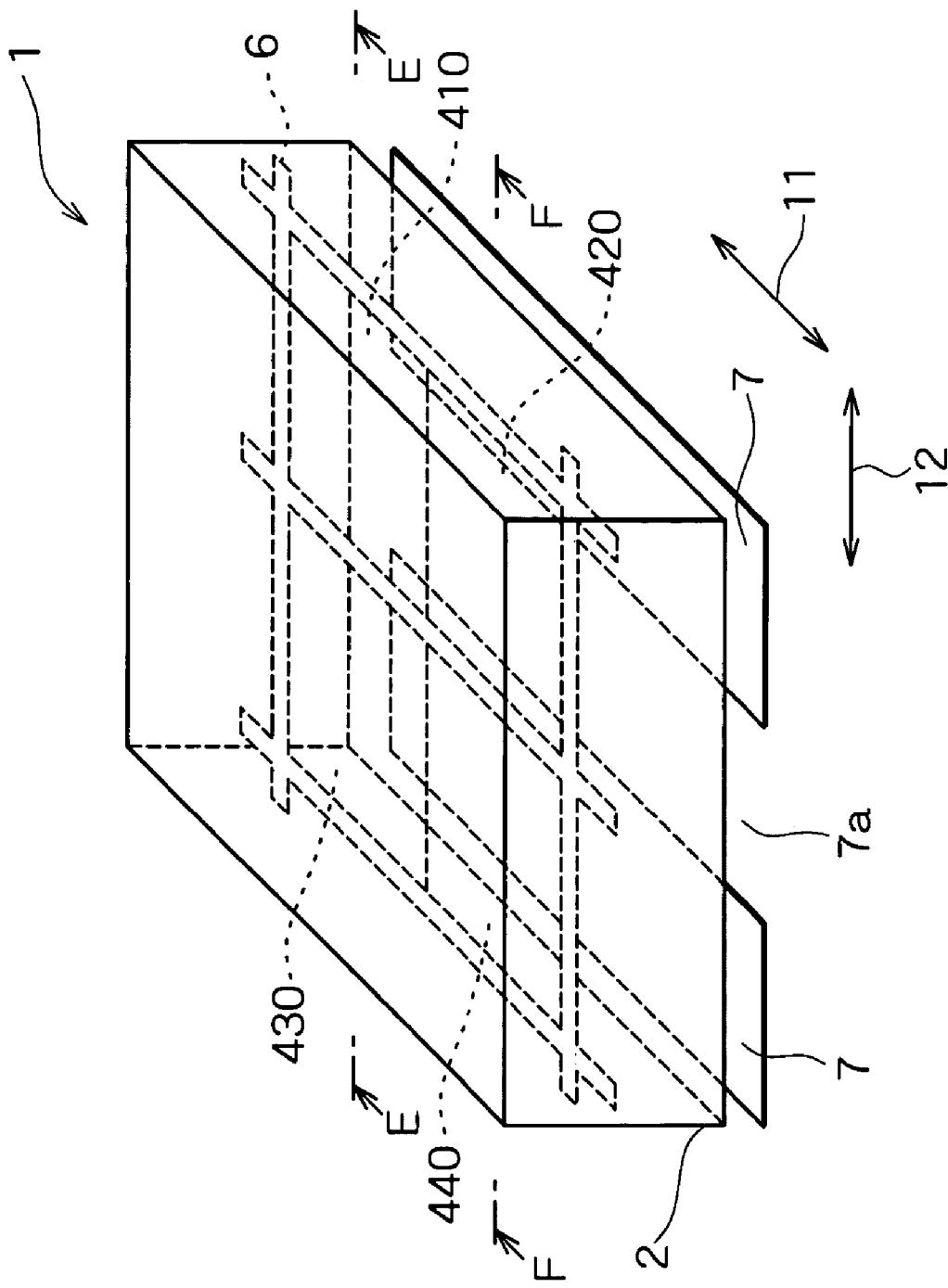
FIG. 19 is a perspective view of a three-dimensional image display device in a fifth embodiment of the invention.

In the following, a fifth embodiment of the invention will be described. FIG. 19 is a perspective view of a three-dimensional image display device according to the fifth embodiment. As shown in FIG. 19, compared with the fourth embodiment, the fifth embodiment is characterized in that a parallax barrier 7 is disposed on the rear side of a semi-transmissive liquid crystal display panel 2, that is, interposed between the semi-transmissive liquid crystal display panel 2 and a light source 10 (see FIG. 20). The structural arrangement other than the above is the same as that in the fourth embodiment.

Figure 20:
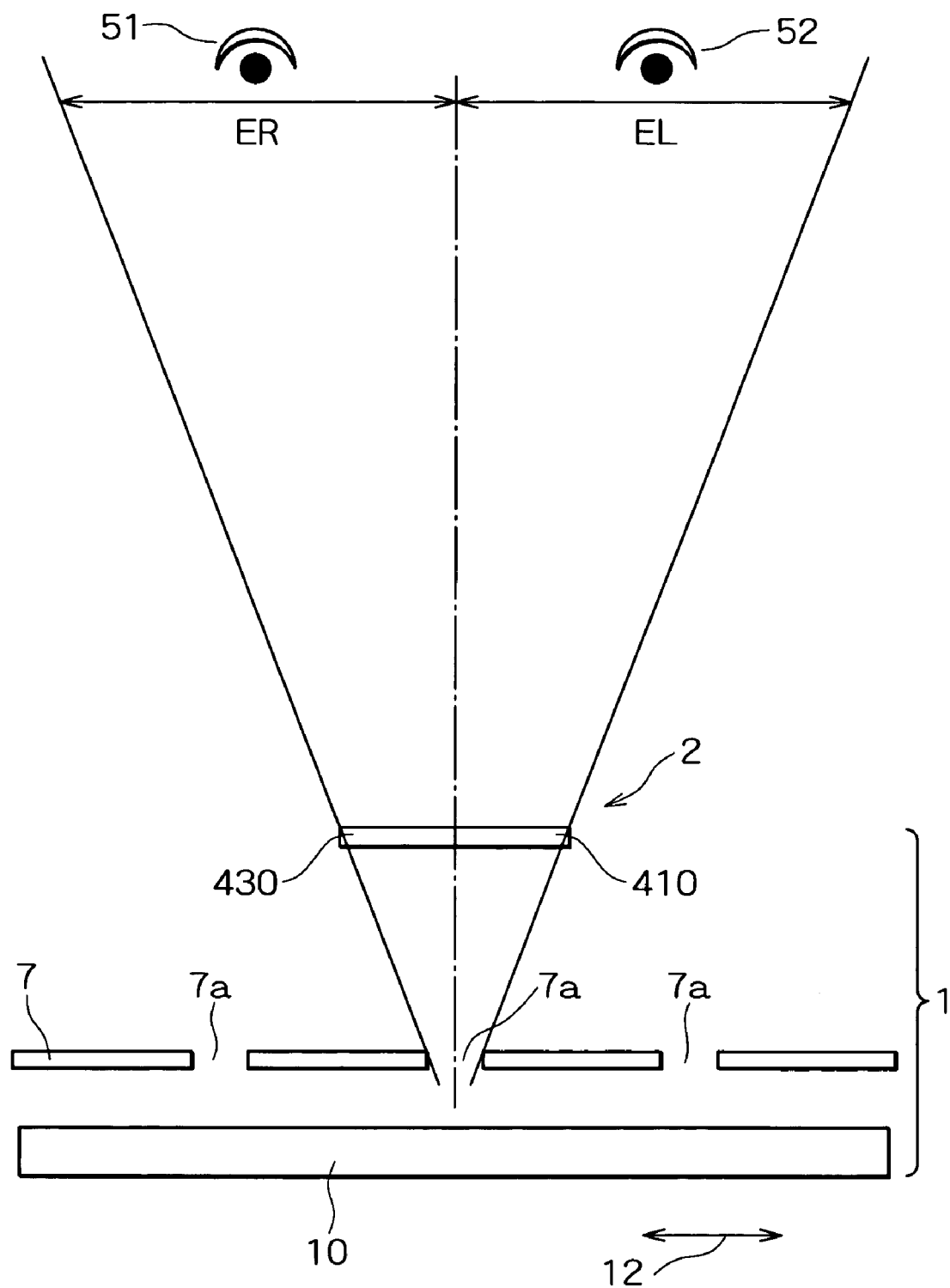
FIG. 20 is a diagram showing the optical model in section viewed from line E-E in FIG. 19.
Figure 21:
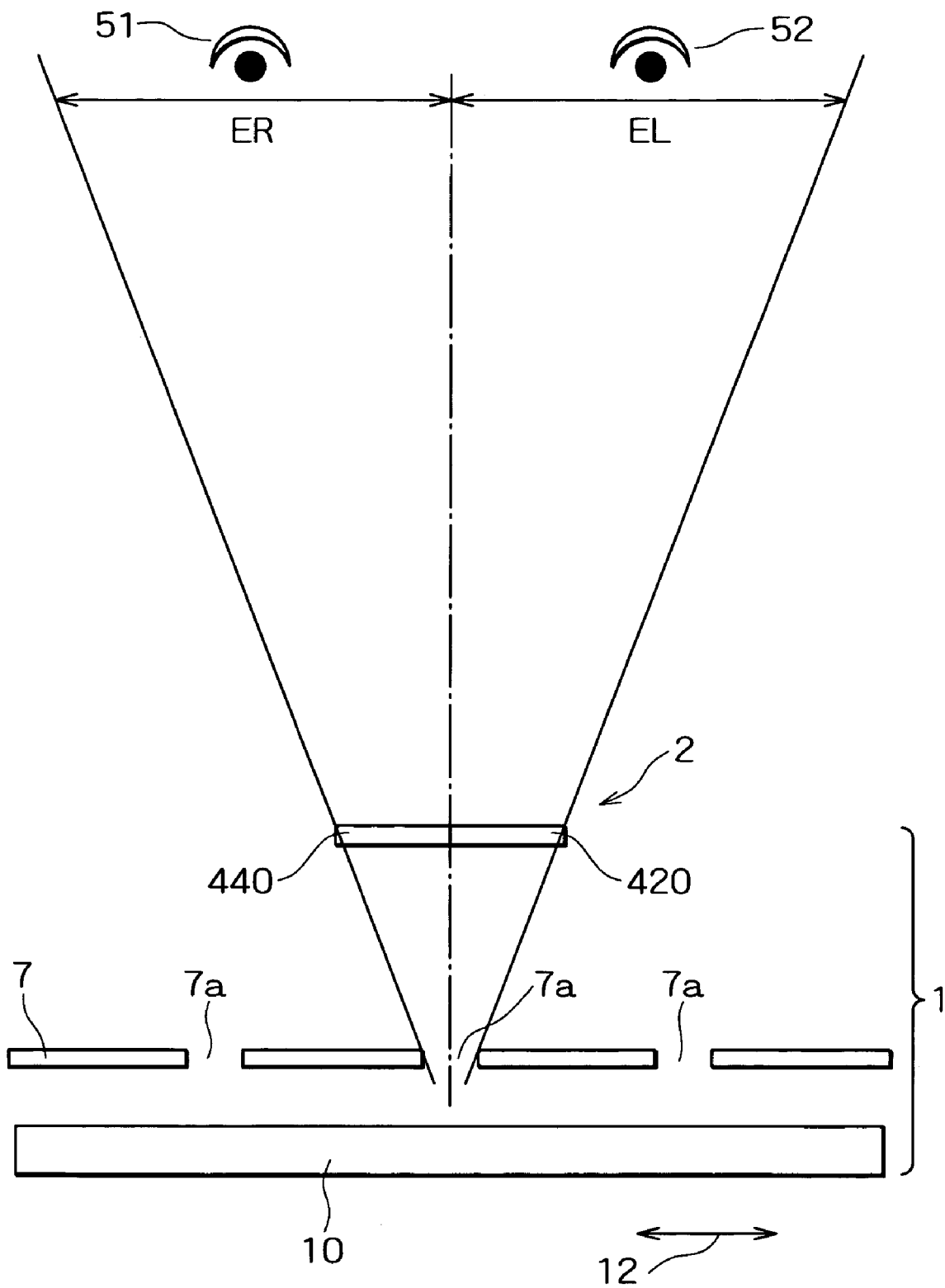
FIG. 21 is a diagram showing the optical model in section viewed from line F-F in FIG. 19.

Then, the function and advantages resulting from the three-dimensional image display device according to the fifth embodiment will be described. FIG. 20 is a diagram showing the optical model of the device in section viewed from line E-E in FIG. 19, and FIG. 21 is a diagram showing the optical model of the device in section viewed from line F-F in FIG. 19. As shown in FIGS. 20 and 21, the light emitted from the light source 10 turned on is incident on the parallax barrier 7. Part of light incident on the parallax barrier 7 passes through the slit 7a and then enters the semi-transmissive liquid crystal display panel 2, whereas the remaining part of the light is intercepted. In this case, the light incident on the transmissive region 410 in the pixel for the left eye and the light incident on the transmissive region 430 in the pixel for the right eye in the semi-transmissive liquid crystal display panel 2 pass through the corresponding regions, and then travel to the areas EL and ER, respectively, whereas the light incident on the reflective region 420 in the pixel for the left eye and the light incident on the reflective region 440 in the pixel for the right eye in the semi-transmissive liquid crystal display panel 2 are intercepted by the corresponding metal films in these regions, thereby providing no contribution to the display.

On the other hand, as shown in FIG. 21, the exterior light enters the semi-transmissive liquid crystal display panel 2 from the front side. The exterior light incident on the reflective region 420 in the pixel for the left eye and the reflective region 440 in the pixel for the right eye is reflected by the corresponding metal films (not shown) in these regions, and then goes to the front side without interception by the parallax barrier 7, and arrives at the areas EL and ER. However, the light incident on the transmissive region 410 in the pixel for the left eye and the transmissive region 430 in the pixel for the right eye passes through the parallax barrier 7, thereby providing no contribution to the display.

When, therefore, a viewer places his own left eye 52 on the area EL and his own right eye 51 on the area ER, he can view a three-dimensional image resulting from the transmitted light. In this case, the reflected light is deflected neither toward the areas EL nor toward the area ER, so that the display resulting from the reflected light becomes a two-dimensional display. In the fifth embodiment, however, a reduction in the visibility due to the parallax barrier can be suppressed by disposing the parallax barrier 7 on the rear side of the semi-transmissive liquid crystal display panel 2. The advantages other than the above in the fifth embodiment are the same as those in the fourth embodiment.

The dual eye type three-dimensional image display device is described in the fifth embodiment. However, the fifth embodiment is also applicable to an N-eye type three-dimensional image display device (N is an integer greater than 2).

Figure 22:
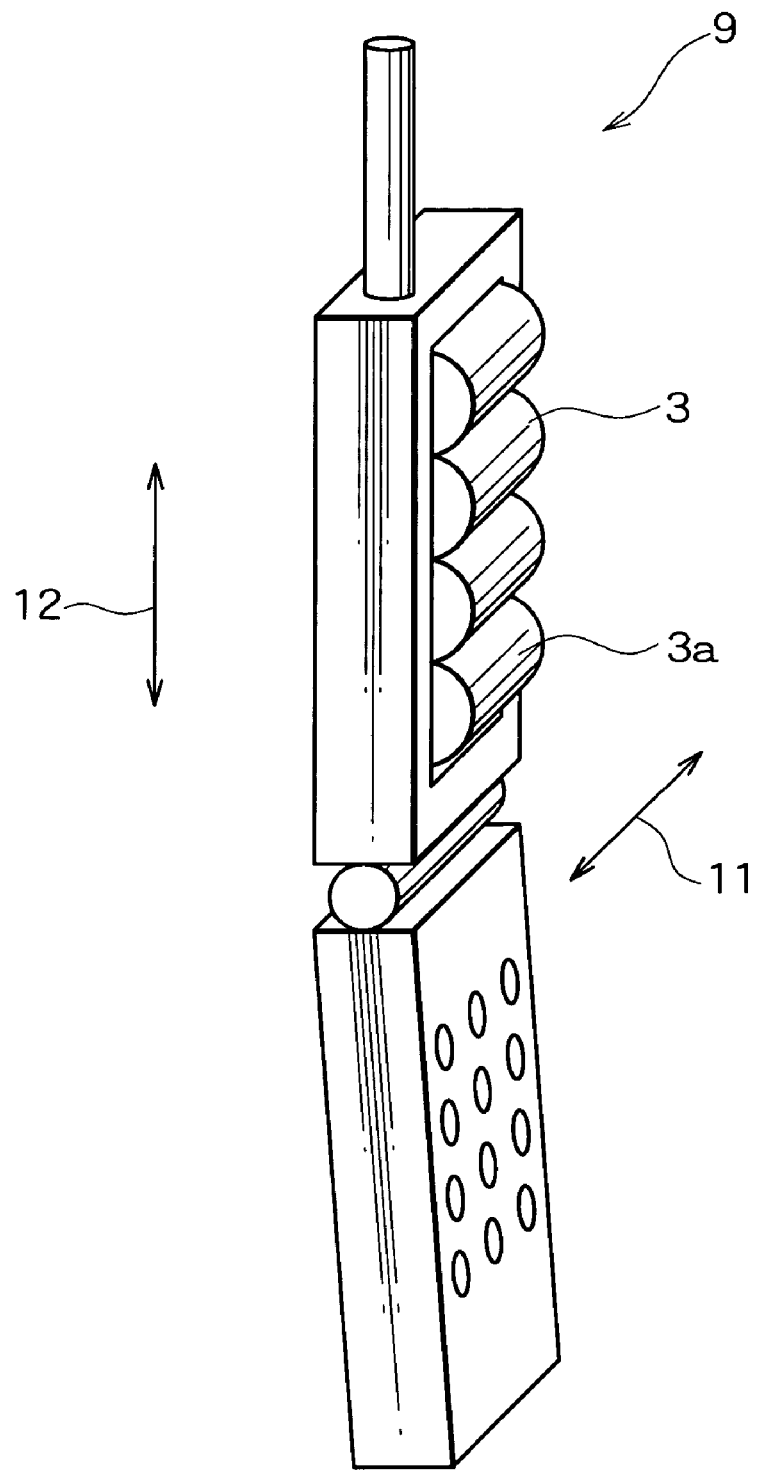
FIG. 22 is a perspective view of a portable terminal device in a sixth embodiment of the invention.
Figure 23:
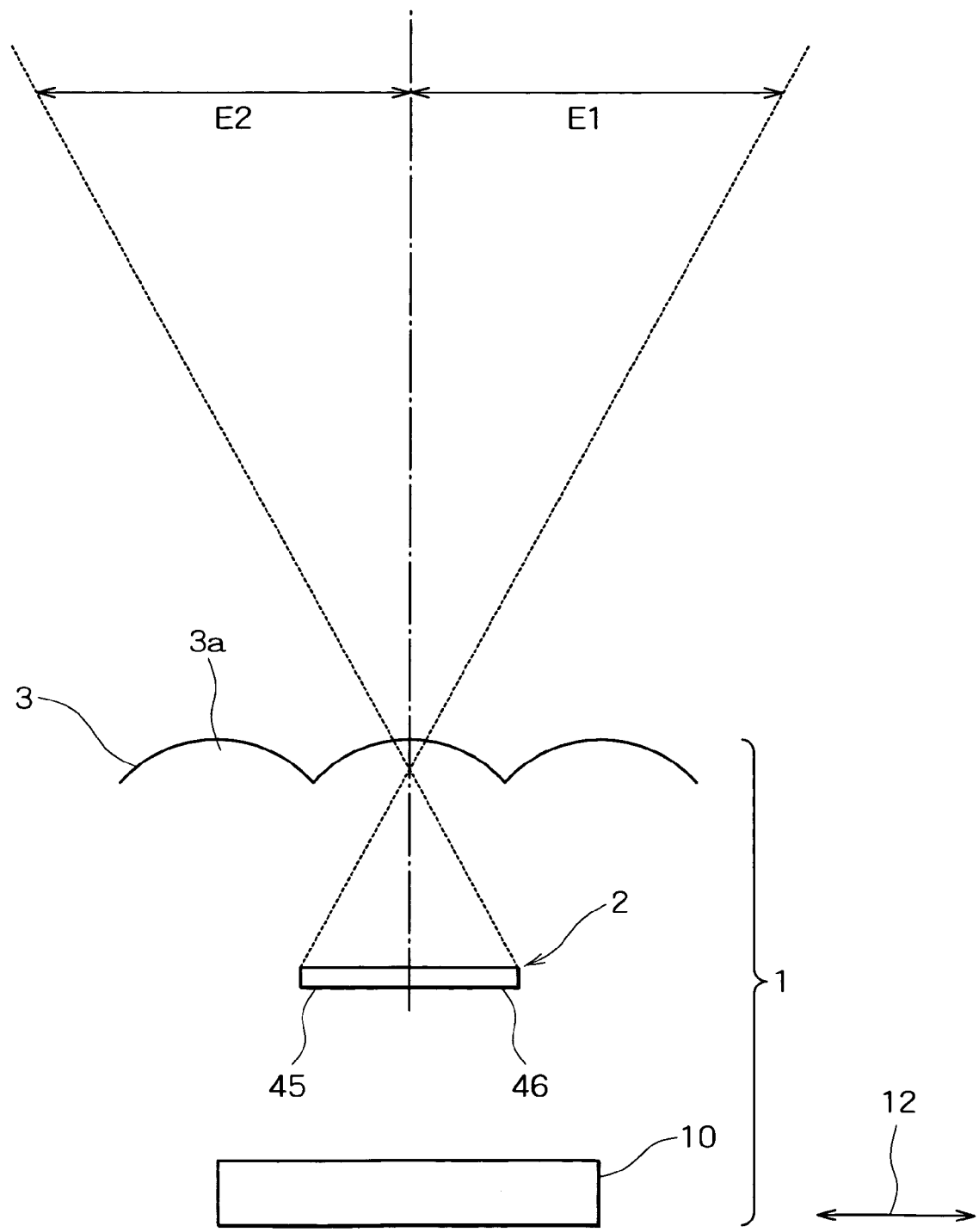
FIG. 23 is a diagram of the optical model illustrating the operation of an image display device in the embodiment.

The sixth embodiment of the invention will be described below. FIG. 22 is a perspective view showing a portable terminal device in the sixth embodiment, and FIG. 23 is a diagram of the optical model illustrating the operation of an image display device in the embodiment. As shown in FIG. 22, an image display device is mounted in a cellular phone 9 as a portable terminal device. The sixth embodiment differs from the first embodiment in that the longitudinal direction 11 of the cylindrical lens 3a constituting the lenticular lens 3 is the lateral direction of the image display device or the horizontal direction of an image and the array direction 12 of the cylindrical lens 3a is the longitudinal direction or the vertical direction of an image. While FIG. 22 shows only four cylindrical lenses 3a to simplify the illustration, actually there are cylindrical lenses 3a equal in number to the pixels laid out in the direction 11.

As shown in FIG. 23, plural pairs of pixels laid out on the display panel 2 in a matrix form, each comprised of a pixel 45 for the first viewpoint (hereinafter referred to as "first-viewpoint pixel 45") and a pixel 46 for the second viewpoint (hereinafter referred to as "second-viewpoint pixel 46"). The array direction of the first-viewpoint pixel 45 and the second-viewpoint pixel 46 in a single pixel pair is the array direction 12 of the cylindrical lens 3a or the longitudinal direction (vertical direction). A transmissive region and a reflective region are provided in each of the pixels 45 and 46 and are laid out in longitudinal direction 11 of the cylindrical lens 3a or the lateral direction of the display plane (horizontal direction). The other structure of the sixth embodiment than those discussed above is the same as that of the first embodiment.

The operation of the image display device according to the embodiment will be described below. As shown in FIG. 23, the light source 10 emits light which enters the display panel 2. At this time, the first-viewpoint pixel 45 displays an image for the first viewpoint and the second-viewpoint pixel 46 displays an image for the second viewpoint. The image for the first viewpoint and the image for the second viewpoint are not a three-dimensional image having a parallax but two-dimensional images. While both images may be independent images, they may be images indicating information on correlation therebetween.

The lights which have entered the transmissive regions of the first-viewpoint pixel 45 and the second-viewpoint pixel 46 of the display panel 2 transmit those regions and travel toward the lenticular lens 3. Those lights are refracted by the cylindrical lens 3a of the lenticular lens 3 and respectively output toward areas E1 and E2. The areas E1 and E2 are laid out in the longitudinal direction. Outside light, such as natural light or illumination light, transmits through the lenticular lens 3 from front and enters the liquid crystal display panel 2. Of the light input to the liquid crystal display panel 2, the light component which has entered the transmissive region of each pixel transmits toward the rear of the liquid crystal display panel 2, i.e., the light source 10 and does not contribute to display.

Meanwhile, the light component which has entered the reflective region of each pixel transmits through the liquid crystal layer of the liquid crystal display panel 2, is reflected by the metal film, then transmits the liquid crystal layer again to enter the lenticular lens 3. At this time, when a viewer directs both eyes in the area E1 at this time, the viewer can view the image for the first viewpoint, whereas when the viewer directs both eyes in the area E2, the viewer can view the image for the second viewpoint.

The sixth embodiment has such an advantage that by merely changing the angle of the cellular phone 9, the viewer can direct both eyes to the area E1 or the area E2 to selectively view the image for the first viewpoint or the image for the second viewpoint. In case where the image for the first viewpoint and the image for the second viewpoint have some correlation, particularly, the images can be switched from one to other for viewing by the simple scheme of changing the viewing angle, thereby improving the usability considerably.

In case where the image for the first viewpoint and the image for the second viewpoint are laid out in the lateral direction, the right eye and left eye may see different images depending on the viewing position. In this case, the viewer may be confused and cannot identify the images for the individual viewpoints. In case where images for plural viewpoints are laid out in the longitudinal direction as done in the sixth embodiment, by way of contrast, the viewer can always view the images for the individual viewpoints with both eyes and can thus easily identify the images. The other advantages of the sixth embodiment are the same as those of the first embodiment. The sixth embodiment may be combined with any one of the second to fifth embodiments.

The foregoing descriptions of the first to sixth embodiments have been given of an image display device which is mounted in a portable telephone or so and supplies images having a parallax to the right and left eyes of a single viewer to provide a three-dimensional image or simultaneously supply plural types of images to a single viewer. However, the image display device according to the invention is not limited to this type but may be an image display device which has a large display panel and supplies plural different images to plural viewers.

What is claimed is:

1. An image display device comprising:
   a light source;
   a display panel disposed in front of said light source and having a plurality of pixel sections in the form of a matrix, each of said pixel sections including a first pixel for displaying an image for a first viewpoint and a second pixel for displaying an image for a second viewpoint, said second pixel being disposed at a position apart from said first pixel in a first direction; and
   an optical unit disposed in front of said display panel for deflecting light emitted from said first and second pixels,
   wherein each of said first and second pixels includes a transmissive region for transmitting the light emitted from said light source to said optical unit and a reflective region for reflecting exterior light incident on a front side of said display panel to said optical unit, and wherein said transmissive region and said reflective region are arranged in a second direction perpendicular to the first direction in each pixel,
   wherein said transmissive regions in said pixel sections are arranged in a line in the first direction, and said reflective regions in said pixel sections are arranged in a line in the first direction, and lines of said transmissive regions and lines of said reflective regions alternate repeatedly in the second direction, and
   wherein said optical unit is a lenticular lens in which a plurality of cylindrical lenses is arranged such that a geometric axis of each cylindrical lens is substantially aligned with a space between the first pixel and the second pixel of at least one pixel section, and the geometric axis of said cylindrical lens extends along said second direction.

2. An image display device according to claim 1, wherein each of said transmissive region and said reflective region is divided into a plurality of sub-regions for color different from each other, and sub-regions for the same color are arranged along the first direction.

3. An image display device according to claim 2, wherein each of said at least one transmissive region and said at least one reflective region is divided into a red sub-region, green sub-region and blue sub-region.

4. An image display device according to claim 1, wherein each of said transmissive region and said reflective region is divided into a plurality of sub-regions for color different from each other, and sub-regions for the same color are arranged along the second direction.

5. An image display device according to claim 1, wherein said display panel is a liquid crystal display panel.

6. An image display device according to claim 1, wherein said first direction is a horizontal direction of a display plane.

7. An image display device according to claim 6, wherein said image for said first viewpoint is an image for the left eye and said image for said second viewpoint is an image for the right eye which has a parallax with respect to said image for the right eye to thereby provide a three-dimensional image.

8. An image display device according to claim 1, wherein said first direction is a vertical direction of a display plane.

9. A portable terminal device including said image display device according to claim 1.

10. A portable terminal device according to claim 9, wherein said portable terminal device is any one of a cellular phone, portable terminal, PDA, game device, digital camera and digital video camera.

11. The image display device of claim 1, wherein an area of the transmissive region is equal to an area of the reflective region.

12. An image display device comprising:
a light source;
a display panel disposed in front of said light source and having a plurality of pixel sections in the form of a matrix, each of said pixel sections including a first pixel for displaying an image for a first viewpoint and a second pixel for displaying an image for a second viewpoint, said second pixel being disposed at a position apart from said first pixel in a first direction; and
an optical unit disposed in front of said display panel for deflecting light emitted from said first and second pixels,
wherein each of said first and second pixels includes a transmissive region for transmitting the light emitted from said light source to said optical unit and a reflective region for reflecting exterior light incident on a front side of said display panel to said optical unit, and wherein said transmissive region and said reflective region are arranged in a second direction perpendicular to the first direction in each pixel,
wherein said transmissive regions in said pixel sections are arranged in a line in the first direction, and said reflective regions in said pixel sections are arranged in a line in the first direction, and each said line of said transmissive region and each said line of said reflective region alternates repeatedly in the second direction, and
wherein said optical unit is a parallax barrier in which a plurality of slits is arranged such that a longitudinal direction of each slit is substantially aligned with a space between the first pixel and the second pixel of at least one pixel section, and the longitudinal direction of said slit extends along said second direction.

13. An image display device comprising:
a light source;
a display panel disposed in front of said light source and having a plurality of pixel sections in the form of a matrix, each of said pixel sections including a first pixel for displaying an image for a first viewpoint and a second pixel for displaying an image for a second viewpoint, said second pixel being disposed at a position apart from said first pixel in a first direction; and
a parallax barrier interposed between said light source and said display panel, said parallax barrier being formed by arranging a plurality of slits for deflecting the light emitted from said light source such that said slits are disposed with respect to each line of said pixel sections and extend in a second direction perpendicular to the first direction, said second direction being the longitudinal direction of said slits,
wherein each of said first and second pixels includes a transmissive region for transmitting the light emitted from said light source and passed through slits of said parallax barrier to the front and a reflective region for reflecting exterior light incident on a front side of the display panel, and wherein said transmissive region and said reflective region are arranged in the second direction in each pixel,
wherein said transmissive regions in said pixel sections are arranged in a line in the first direction, and said reflective regions in said pixel sections are arranged in a line in the first direction, and each said line of said transmissive region and each said line of said reflective region alternates repeatedly in the second direction, and
wherein a longitudinal direction of each slit is substantially aligned with a space between the first pixel and the second pixel of at least one pixel section, and the longitudinal direction of said slit extends along said second direction.

14. An image display device according to claim 13, wherein each of said transmissive region and said reflective region is divided into a plurality of sub-regions for color different from each other, and sub-regions for the same color are arranged along the first direction.

15. An image display device according to claim 13, wherein each of said transmissive region and said reflective region is divided into a plurality of sub-regions for color different from each other, and sub-regions for the same color are arranged along the second direction.

16. The image display device of claim 13, wherein an area of the transmissive region is equal to an area of the reflective region.

17. A three-dimensional image display device comprising:
a light source;
a display panel disposed in front of said light source and having a plurality of pixel sections in the form of a matrix, each of said pixel sections including a first pixel for displaying an image for a first viewpoint and a second pixel for displaying an image for a second viewpoint, said second pixel being disposed at a position apart from said first pixel in a horizontal direction; and
an optical unit disposed in front of said display panel for deflecting light emitted from said first and second pixels in the horizontal direction,
wherein each of said first and second pixels includes a transmissive region for transmitting the light emitted from said light source to said optical unit and a reflective region for reflecting exterior light incident on a front side of said display panel to said optical unit, and wherein said transmissive region and said reflective region are arranged in a vertical direction perpendicular to the horizontal direction in each pixel,
wherein said transmissive regions in said pixel sections are arranged in a line in the horizontal direction, and said reflective regions in said pixel sections are arranged in a line in the horizontal direction, and each said line of said transmissive region and each said line of said reflective region alternates repeatedly in the vertical direction, and
wherein said optical unit is a lenticular lens in which a plurality of cylindrical lenses is arranged such that a geometric axis of each cylindrical lens is substantially aligned with a space between the first pixel and the second pixel of at least one pixel section, and the geometric axis of said cylindrical lens extends along said vertical direction.

18. A three-dimensional image display device according to claim 17, wherein each of said transmissive region and said reflective region is divided into a plurality of sub-regions for color different from each other, and sub-regions for the same color are arranged along the horizontal direction.

* * * * *